(12) United States Patent
Tsunokawa

(10) Patent No.: US 7,979,454 B2
(45) Date of Patent: Jul. 12, 2011

(54) INFORMATION PROCESSING APPARATUS, AND METHOD AND SYSTEM FOR SEARCHING FOR REPUTATION OF CONTENT

(75) Inventor: Motoki Tsunokawa, Kanagawa (JP)

(73) Assignee: Sony Corporation (JP)

( * ) Notice: Subject to any disclaimer, the term of this patent is extended or adjusted under 35 U.S.C. 154(b) by 432 days.

(21) Appl. No.: 12/215,743

(22) Filed: Jun. 30, 2008

(65) Prior Publication Data
US 2009/0012946 A1    Jan. 8, 2009

(30) Foreign Application Priority Data
Jul. 2, 2007 (JP) .............................. P2007-173637

(51) Int. Cl.
G06F 17/30 (2006.01)
(52) U.S. Cl. ...................... 707/758; 707/913
(58) Field of Classification Search .............. 707/758, 707/913
See application file for complete search history.

(56) References Cited

U.S. PATENT DOCUMENTS

| 7,761,452 B2* | 7/2010 | Chisaka ........................ 707/736 |
| 2003/0093790 A1 | 5/2003 | Logan et al. |
| 2005/0240957 A1* | 10/2005 | Tsunokawa et al. ............ 725/20 |
| 2006/0129446 A1 | 6/2006 | Ruhl et al. |
| 2007/0143122 A1 | 6/2007 | Holloway et al. |

FOREIGN PATENT DOCUMENTS

| JP | 9-218876 A | 8/1997 |
| JP | 10-069496 A | 3/1998 |
| JP | 2001355278 | 12/2001 |
| JP | 2002-175330 A | 6/2002 |
| JP | 2003157253 A | 5/2003 |
| JP | 2003157254 A | 5/2003 |
| JP | 2003157255 A | 5/2003 |
| JP | 2003248681 A | 9/2003 |
| JP | 2004-280569 A | 10/2004 |
| JP | 2004-287683 A | 10/2004 |

OTHER PUBLICATIONS

Fujimura, Blogranger- A Multi-faceted Blog Search Engine, May 22-26, 2006, Edinburgh, UK.*
Chaovalit P et al: "Movie Review Mining: a Comparison between Supervised and Unsupervised Classification Approaches" (Jan. 3, 2005), pp. 1-9.
European Search Report, EP 08 15 8554, Dec. 15, 2008.
Fujimara, S. et al., A Consideration of Extracting Reputations and Evaluative Expressions from the Web, Technical Report of IEICE., Jul. 2004.

* cited by examiner

Primary Examiner — Jean B. Fleurantin
Assistant Examiner — Thu-Nguyet Le
(74) Attorney, Agent, or Firm — Lerner, David, Littenberg, Krumholz & Mentlik, LLP

(57) ABSTRACT

An information processing apparatus, includes: an acquisition section configured to acquire content-related information; a keyword extraction section configured to extract a search keyword from the content-related information; a site search section configured to perform a search through the Internet for websites with a web page, and acquire information concerning websites; a first site selection section configured to select top N websites from the websites; a second site selection section configured to access each of the N websites to extract a written text from a web page of each of the N websites, and select two or more of the N websites as seed sites; and a reputation result acquisition section configured to collect written texts from the seed sites and subordinate websites linked to the seed sites, and acquire a reputation result of the content from the collected written texts.

19 Claims, 11 Drawing Sheets

FIG. 3

CREATION OF REPUTATION RULE DICTIONARY

↓

REGISTER REPUTATION EXPRESSIONS AND EVALUATION VALUES (SCORES) THEREOF — T1

↓

REGISTER EXTENT EXPRESSIONS AND WEIGHTING FACTORS (COEFFICIENTS) THEREOF — T2

↓

SUPPLY REPUTATION EXPRESSIONS AND EXTENT EXPRESSIONS TO MORPHOLOGICAL ANALYSIS ENGINE, AND STORE RESULTS — T3

FIG. 4

REPUTATION RULE DICTIONARY

| TYPE | EXPRESSION | SCORE/ COEFFICIENT | MORPHOLOGICAL ANALYSIS RESULT |
|---|---|---|---|
| REPUTATION EXPRESSION | AMUSING | +5 POINTS | xxx@xxx@xxx |
| REPUTATION EXPRESSION | MOVING | +5 POINTS | xxx@xxx@xxx |
| REPUTATION EXPRESSION | GOOD | +2 POINTS | xxx@xxx@xxx |
| REPUTATION EXPRESSION | DULL | −5 POINTS | xxx@xxx@xxx |
| REPUTATION EXPRESSION | NOT GOOD | −2 POINTS | xxx@xxx@xxx |
| EXTENT EXPRESSION | VERY | ×2 | xxx@xxx@xxx |
| EXTENT EXPRESSION | QUITE | ×3 | xxx@xxx@xxx |
| | | | |

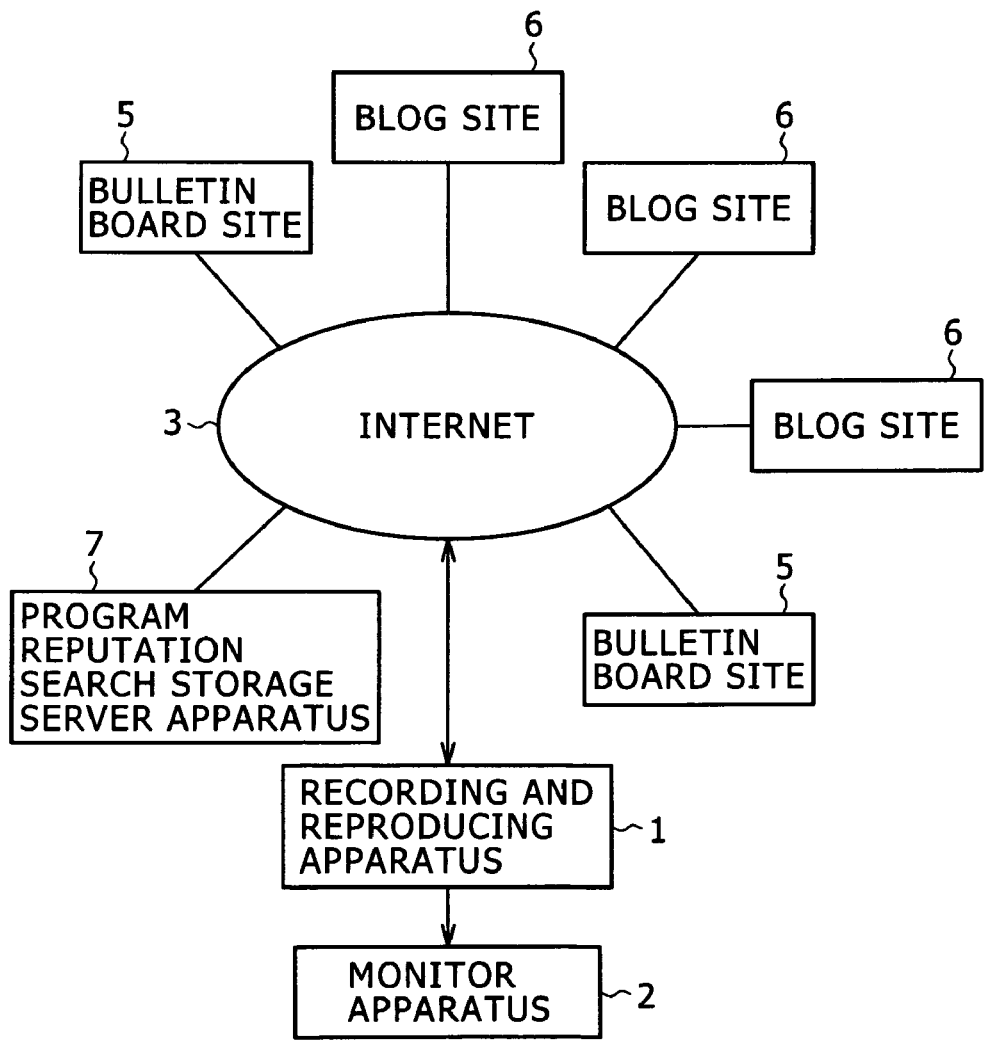

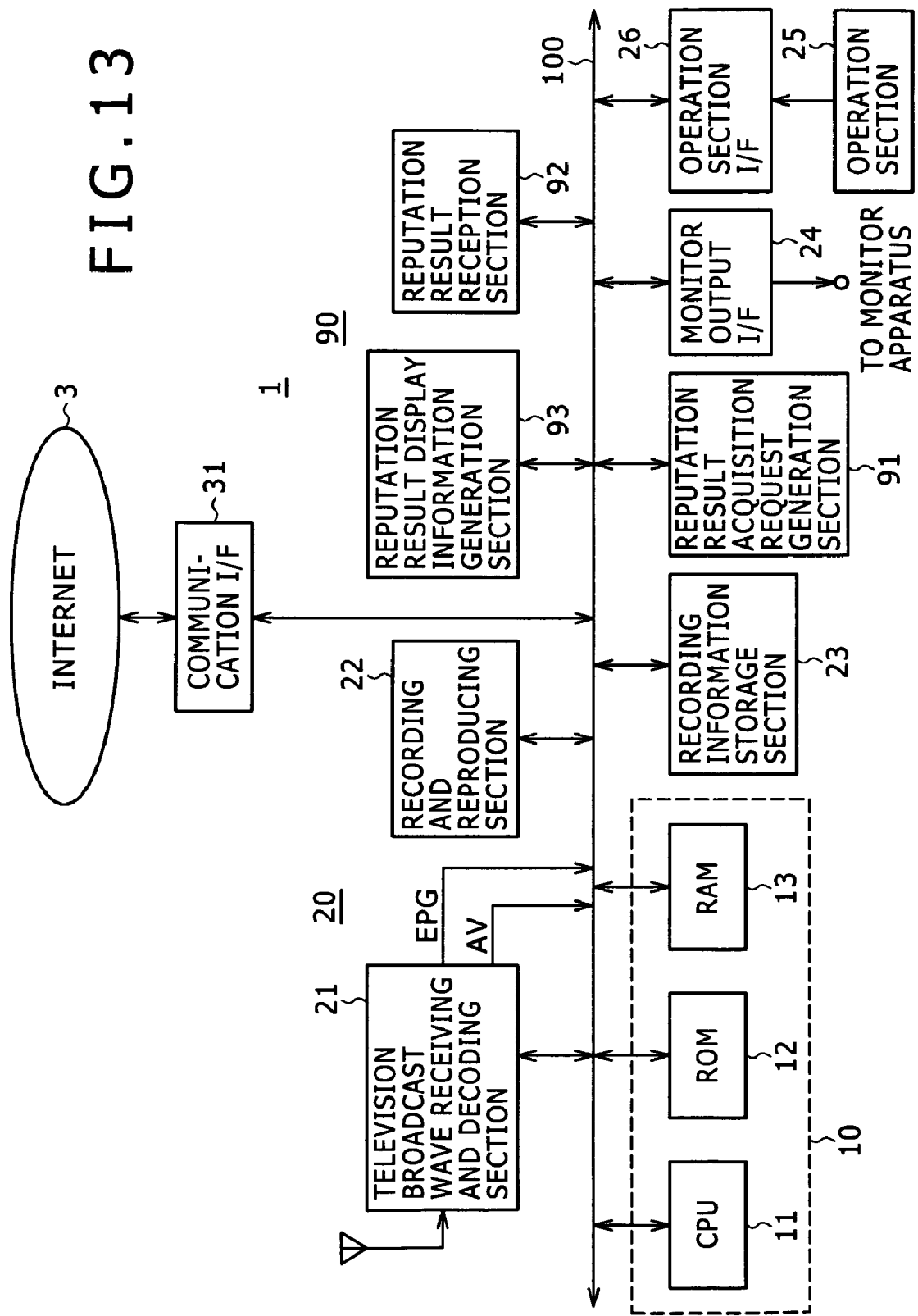

INFORMATION PROCESSING APPARATUS, AND METHOD AND SYSTEM FOR SEARCHING FOR REPUTATION OF CONTENT

CROSS-REFERENCE TO RELATED APPLICATIONS

The present application claims priority from Japanese Patent Application No. JP 2007-173637, filed in the Japanese Patent Office on Jul. 2, 2007, the entire content of which is incorporated herein by reference.

BACKGROUND OF THE INVENTION

1. Field of the Invention

The present invention relates to an apparatus, method, and system for searching for a reputation of a content, such as a broadcast program content or a content stored in a package medium, for example.

2. Description of the Related Art

With a recent increase in capacity of hard disk drives, recording and reproducing apparatuses have emerged that are capable of recording such a large number of television broadcast program contents as to exceed one day in length, for example. Many of such recording and reproducing apparatuses are equipped with a feature of automatically selecting television broadcast program contents based on taste information or a keyword registered by a user, and recording the selected television broadcast program contents. Thus, the user is often obliged to consider which of the large number of recorded television broadcast program contents to reproduce.

The user of the above type of recording and reproducing apparatuses is able to select an arbitrary recorded television broadcast program content from the large number of recorded television broadcast program contents, and reproduce and watch the selected recorded television broadcast program content. It is desirable, however, that the user be able to know a reputation of each of the recorded television broadcast program contents, when selecting the recorded television broadcast program content to be reproduced. The reputation of each of the recorded television broadcast program contents will be useful as a basis for selecting a desired content from the large number of television broadcast program contents.

On the Internet, there are a large number of websites on which users have written their impressions or opinions concerning various topics. There have already been proposed systems for collecting such impressions and opinions concerning the various topics, and analyzing these impressions and opinions using a morphological analysis technique or a syntactic analysis technique to identify reputations concerning the topics (see Japanese Patent Laid-open No. 2003-248681, 2003-157255, 2003-157254, and 2003-157253, for example).

SUMMARY OF THE INVENTION

However, the systems described in the documents listed above do not take into account characteristics of information concerning the topic of the television broadcast program contents, but are general-purpose systems that deal with various topics. Accordingly, in order to identify the reputation, it is necessary to crawl through an enormous number of websites of a wide variety of types to collect data therefrom and store the data. Therefore, the scale of a server system has to be correspondingly large.

More specifically, there is an enormous number of websites on the Internet, and in the above systems in related art, each of the enormous number of websites is accessed to collect data from web pages of each of the websites and store the data, and an enormous amount of information containing the impressions and opinions concerning the topics thus stored is subjected to morphological analysis and syntactic analysis to identify the reputation. Therefore, the scale of the server system is inevitably very large.

Because of this need for a very large scale of the server system, it has been difficult to enable a personal device owned by an individual user to perform a search for reputations of contents, such as the television broadcast program contents. Moreover, in related art, the enormous number of websites are accessed one after another to collect information containing impressions and opinions concerning a target topic (i.e., a topic about which the reputation should be searched for), and therefore it takes a long time to obtain information concerning the reputation, i.e., a result of the search.

The present invention addresses the above-identified, and other problems associated with existing methods and apparatuses, and provides an apparatus, method, and system for making it possible to obtain a reputation result of a content in a relatively short time and with a relatively small-scale structure.

According to one embodiment of the present invention, there is provided an information processing apparatus including: an acquisition section; a keyword extraction section; a site search section; a first site selection section; a second site selection section; and a reputation result acquisition section. The acquisition section is configured to acquire content-related information including a title of a content and information describing a content of the content. The keyword extraction section is configured to extract a search keyword from the content-related information acquired by the acquisition section. The site search section is configured to perform a search through the Internet for websites with a web page including the search keyword extracted by the keyword extraction section, and acquire information concerning a plurality of websites found as a result of the search. The first site selection section is configured to select top N websites from the plurality of websites found as a result of the search performed by the site search section, N being a predetermined integer greater than one. The second site selection section is configured to access each of the N websites selected by the first site selection section to extract a written text from a web page of each of the N websites, and select two or more of the N websites as seed sites, the written text extracted from each of the seed sites containing so many instances of the search keyword as to exceed a predetermined threshold. The reputation result acquisition section is configured to collect written texts from the two or more seed sites selected by the second site selection section and subordinate websites linked to the seed sites, and acquire a reputation result of the content from the collected written texts.

According to the above information processing apparatus, the keyword extraction section extracts the search keyword from the content-related information of the content, the reputation of which is to be searched for. Then, the site search section (e.g., a search engine) automatically accesses websites on the Internet one after another to collect information from a web page of each of the websites, and detects websites with a web page including the search keyword extracted by the keyword extraction section.

Then, the first site selection section selects the top N websites from those websites with the web page including the search keyword. N is a predetermined integer greater than one.

Then, the second site selection section accesses the N websites selected by the first site selection section to extract the written text from the web page of each of the N websites, and selects two or more of the N websites as the seed sites. The written text extracted from each of the seed sites contains so many instances of the search keyword as to exceed the predetermined threshold. Here, the seed sites refer to websites from which crawling through websites on lower levels linked thereto is started.

The reputation result acquisition section crawls through the seed sites selected by the second site selection section and the subordinate websites linked to the seed sites (i.e., accesses these websites one after another) to collect the written text from each web page. Then, the reputation result acquisition section subjects the collected written texts to morphological analysis and syntactic analysis, for example, to acquire the reputation result of the content.

According to this information processing apparatus, from the websites found as a result of the search, a smaller number of websites are selected in two steps by the first and second site selection sections, and the written texts used for acquiring the reputation result are collected from the web pages of the smaller number of websites, and the reputation result is obtained from these collected written texts. Thus, this information processing apparatus has a smaller-scale structure than those in related art, but is capable of obtaining the reputation result in a relatively short time.

According to another embodiment of the present invention, there is provided an information processing apparatus including: an acquisition section; a keyword extraction section; a site search requesting section; a first site selection section; a second site selection section; and a reputation result acquisition section. The acquisition section is configured to acquire content-related information including a title of a content and information describing a content of the content. The keyword extraction section is configured to extract a search keyword from the content-related information acquired by the acquisition section. The site search requesting section is configured to request a search site on the Internet to perform a search for websites with a web page including the search keyword extracted by the keyword extraction section, and acquire information concerning a plurality of websites found as a result of the search. The first site selection section is configured to select top N websites from the plurality of websites found as a result of the search performed by the search site, N being a predetermined integer greater than one. The second site selection section is configured to access each of the N websites selected by the first site selection section to extract a written text from a web page of each of the N websites, and select two or more of the N websites as seed sites, the written text extracted from each of the seed sites containing so many instances of the search keyword as to exceed a predetermined threshold. The reputation result acquisition section is configured to collect written texts from the two or more seed sites selected by the second site selection section and subordinate websites linked to the seed sites, and acquire a reputation result of the content from the collected written texts.

Unlike the previously described information processing apparatus, this information processing apparatus does not have the site search section. Instead, this information processing apparatus has the site search requesting section. The site search requesting section requests the search site on the Internet to perform a search for websites with a web page including the search keyword extracted by the keyword extraction section, and acquires the information concerning the plurality of websites found as a result of the search.

Then, as is also the case where the previously described information processing apparatus, a smaller number of websites are selected from the websites found as a result of the search by the first and second site selection sections, and the smaller number of websites selected are used to acquire the reputation result. Reputation information is acquired from the written texts collected from the smaller number of websites.

This information processing apparatus does not have the site search section, and instead requests the search site on the Internet to perform the search. Thus, this information processing apparatus has a smaller-scale structure than the previously described information processing apparatus. That is, the use of the search site on the Internet allows this information processing apparatus to have a reduced scale in structure, so that this information processing apparatus can be contained even in a device for personal use, such as a recording and reproducing apparatus, for example.

According to yet another embodiment of the present invention, there is provided a method for searching for a reputation of a content employed by an information processing apparatus, the method including the steps of: acquiring; extracting; searching and acquiring; selecting; and accessing and selecting. The acquiring step acquires content-related information including a title of the content and information describing a content of the content. The extracting step extracts a search keyword from the content-related information acquired in the acquiring step. The searching and acquiring step searches through the Internet for websites with a web page including the search keyword extracted in the extracting step, and acquires information concerning a plurality of websites found as a result of the search. The selecting step selects top N websites from the plurality of websites found as a result of the search in the searching step, N being a predetermined integer greater than one. The accessing and selecting step accesses each of the N websites selected in the selecting step to extract a written text from a web page of each of the N websites, and selects two or more of the N websites as seed sites, the written text extracted from each of the seed sites containing so many instances of the search keyword as to exceed a predetermined threshold.

According to yet another embodiment of the present invention, there is provided a system for searching for a reputation of a content, the system including a server apparatus, a network, and a client apparatus connected to the server apparatus via the network. The server apparatus includes: an acquisition section; a keyword extraction section; a site search section; a first site selection section; a second site selection section; a reputation result acquisition section; a storage section; and a reputation result sending section. The acquisition section is configured to acquire content-related information including a title of the content and information describing a content of the content. The keyword extraction section is configured to extract a search keyword from the content-related information acquired by the acquisition section. The site search section is configured to perform a search through the Internet for websites with a web page including the search keyword extracted by the keyword extraction section, and acquire information concerning a plurality of websites found as a result of the search. The first site selection section is configured to select top N websites from the plurality of websites found as a result of the search performed by the site search section, N being a predetermined integer greater than one. The second site selection section is configured to access each of the N websites selected by the first site selection section to extract a written text from a web page of each of the N websites, and select two or more of the N websites as seed sites, the written text extracted from each of the seed sites containing so many instances of the search keyword as to exceed a predetermined threshold. The reputation result acquisition section is configured to collect written texts from the two or more seed sites selected by the second site selection section and subordinate websites linked to the seed sites, and acquire a reputation result of the content from the collected written texts. The storage section is configured to store the reputation results of a plurality of contents as acquired by the reputation result acquisition section such that each of the reputation results is associated with information for identifying a corresponding one of the contents. The reputation result sending section is configured to, when an acquisition request for acquiring the reputation result has been received from the client apparatus via the network, the acquisition request including the information for identifying the content, read the reputation result of the content identified by the information for identifying the content as included in the acquisition request from among the reputation results of the plurality of contents as stored in the storage section, and send the read reputation result to a sender of the acquisition request via the network. The client apparatus includes: a section configured to send the acquisition request for acquiring the reputation result to the server apparatus via the network, the acquisition request including the information for identifying the content; and a section configured to receive the reputation result of the content from the server apparatus, and notify a user of the reputation result.

According to the above-described embodiments of the present invention, a smaller number of websites are selected in two steps from the websites found as a result of the search, and the written texts used for acquiring the reputation result are collected from the web pages of the smaller number of websites, and the reputation result is obtained from these collected written texts. Thus, a reduction in the scale of the structure is accomplished, but nevertheless the reputation result of the content can be obtained in a relatively short time.

BRIEF DESCRIPTION OF THE DRAWINGS

FIG. 3 is a flowchart illustrating creation of a reputation rule dictionary used in the information processing apparatus according to the first embodiment;

FIG. 4 is a diagram illustrating an example of dictionary data for the reputation rule dictionary used in the information processing apparatus according to the first embodiment;

FIG. 10 is a diagram illustrating an exemplary reputation result as displayed by the information processing apparatus according to the first embodiment;

FIG. 11 is a diagram illustrating an outline of an exemplary structure of a reputation search system that includes an information processing apparatus according to a second embodiment of the present invention;

FIG. 13 is a block diagram illustrating an exemplary hardware structure of a client apparatus in a reputation search system according to one embodiment of the present invention.

DETAILED DESCRIPTION OF THE PREFERRED EMBODIMENTS

Hereinafter, embodiments of the present invention will be described with reference to the accompanying drawings.

First Embodiment of Information Processing Apparatus

An information processing apparatus according to a first embodiment of the present invention is a recording and reproducing apparatus, such as a so-called hard disk recorder, that is capable of receiving a television broadcast and storing data of the received television broadcast in a "recording information storage section", such as a hard disk, and also of reading the data from the recording information storage section and reproducing the data.

Figure 1:
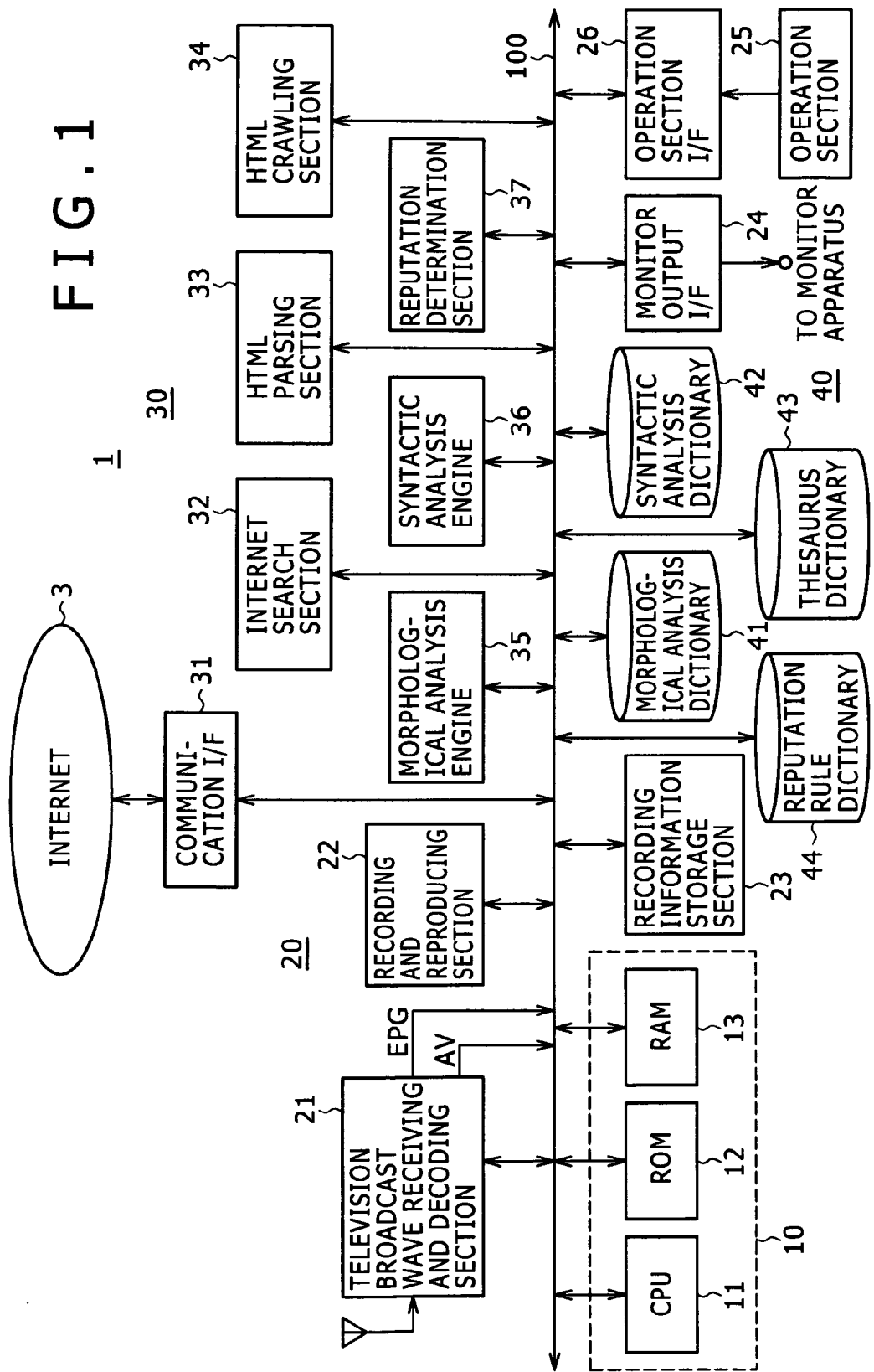
FIG. 1 is a block diagram illustrating an exemplary hardware structure of an information processing apparatus according to a first embodiment of the present invention.
Figure 2:
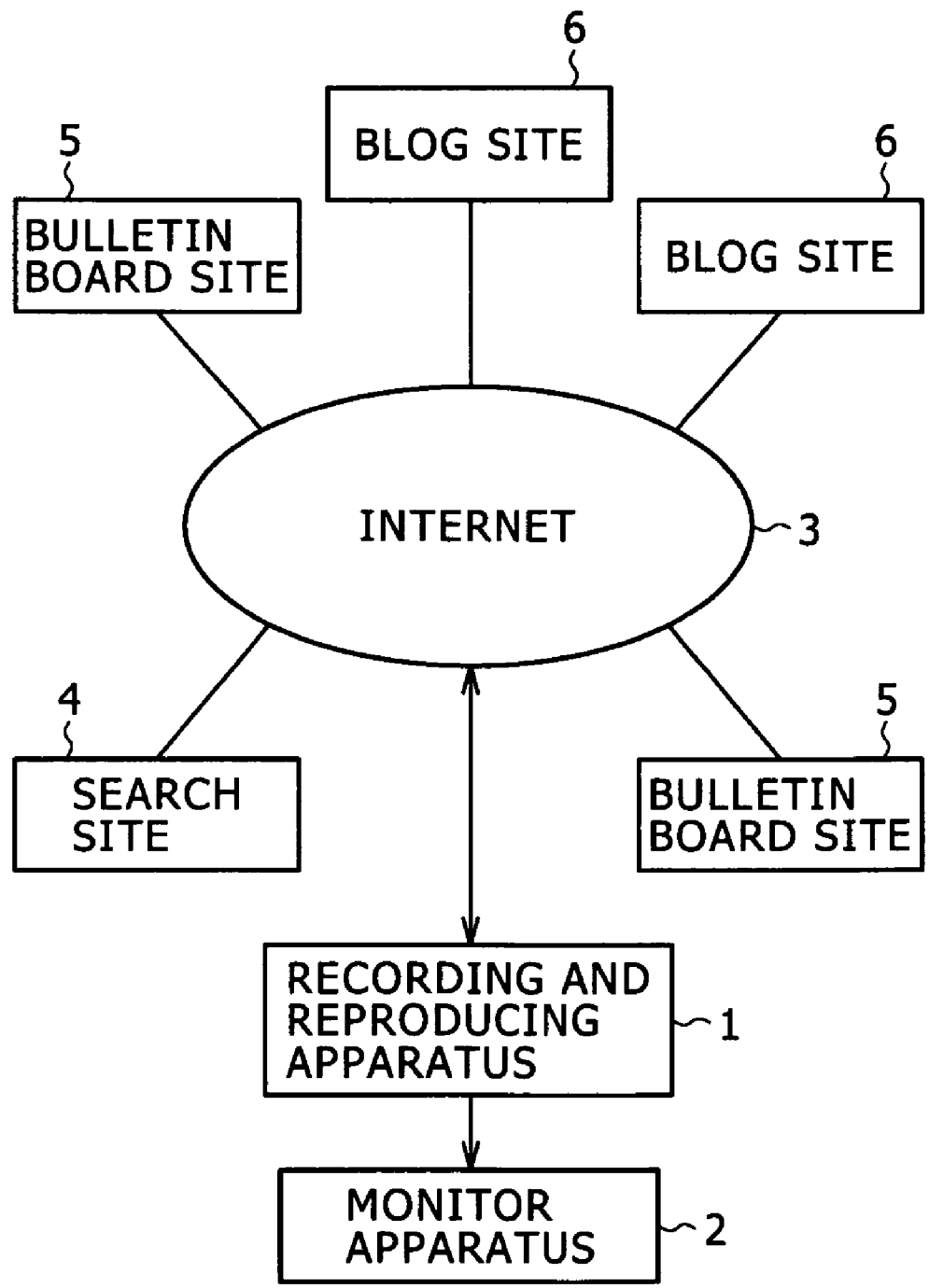
FIG. 2 is a diagram illustrating an outline of the structure of a system that includes the information processing apparatus according to the first embodiment.

FIG. 1 shows a hardware structure of a recording and reproducing apparatus 1, which is the information processing apparatus according to the first embodiment. FIG. 2 shows an outline of the configuration of a content reputation search system that includes the recording and reproducing apparatus 1 according to this embodiment.

As shown in FIG. 2, the recording and reproducing apparatus 1 according to this embodiment is connected to a monitor apparatus 2 and the Internet 3. A search site 4 that has a search engine, a large number of bulletin board sites 5, a large number of blog sites 6, and so on are connected to the Internet 3. Although not shown, the monitor apparatus 2 has a display for displaying images, such as a liquid crystal display (LCD), and a loudspeaker for outputting reproduced sound.

If the search site 4 receives a search keyword from a search-requesting terminal, e.g., the recording and reproducing apparatus 1, through the Internet 3, the search site 4 uses the search engine to perform a search for websites with a web page including the search keyword, and sends a search result to the search-requesting terminal. The search result includes a uniform resource locator (URL) of the website found as a result of the search, and so on, for example.

Each of the bulletin board sites 5 is a website that offers an electronic bulletin board where Internet users who have accessed the website can post their opinions, impressions, and so on at will. The bulletin board sites 5 are managed by a business corporation or an individual. Opinions, impressions, and so on concerning contents or various other topics are posted on the electronic bulletin board at each of the bulletin board sites 5.

Each of the blog sites 6 is a website where an individual or a business corporation posts diary entries, reviews of books or films, or various other types of information. Needless to say, the opinions, impressions, and so on concerning the contents are sometimes published on these blog sites as well. URLs of the blog sites generally contain a word "blog".

The recording and reproducing apparatus 1 according to the first embodiment does not have a search engine that performs a search for the websites with a web page including the search keyword, and instead requests the search site 4 to perform a search for the websites with a web page including the search keyword.

Then, the recording and reproducing apparatus 1 according to this embodiment acquires the search result, i.e., websites found as a result of the search, from the search site 4, and selects, from these websites, websites that are to be used to obtain a reputation result (i.e., information concerning a reputation) of a content whose reputation is being searched for. Then, the recording and reproducing apparatus 1 according to this embodiment collects, from web pages of the selected websites and web pages of subordinate websites that are linked to the selected websites, written information from which to obtain information of the reputation result of the above content. Then, the recording and reproducing apparatus 1 detects words concerning the reputation from the written information, and obtains the reputation result based on the detected words concerning the reputation. Then, in this embodiment, the recording and reproducing apparatus 1 sends the reputation result to the monitor apparatus 2, which displays the reputation result or outputs the reputation result as sound, thereby presenting the reputation result to a user.

The exemplary hardware structure of the recording and reproducing apparatus 1 as shown in FIG. 1 is configured to accomplish the above-described functions. As shown in FIG. 1, the recording and reproducing apparatus 1 according to this embodiment includes a control section 10, a "television broadcast receiving and recording/reproducing section" 20, a reputation search section 30, a reputation search-use dictionaries 40, and a system bus 100. The control section 10, the "television broadcast receiving and recording/reproducing section" 20, the reputation search section 30, and the reputation search-use dictionaries 40 are connected to the system bus 100.

In this embodiment, the control section 10 is formed by a microcomputer, and includes a central processing unit (CPU) 11, a read-only memory (ROM) 12 for programs, and a random-access memory (RAM) 13 for a work area.

The ROM 12 stores a program for control concerning television broadcast program selection, a program for control concerning recording and reproducing of television broadcast program contents, a program for searching for the reputation of the content and acquiring the reputation result, and other programs. The CPU 11 executes the programs stored in the ROM 12 while using the RAM 13 as the work area, thereby controlling the various processes as described above.

The "television broadcast receiving and recording/reproducing section" 20 includes a "television broadcast wave receiving and decoding section" 21, a recording and reproducing section 22, a recording information storage section 23, a monitor output interface 24, an operation section 25, and an operation section interface 26. The control section 10 accepts, via the operation section interface 26, an input of a user operation inputted using the operation section 25, and determines what instruction the input of the user operation corresponds to. Then, based on the determination result, the control section 10 performs processing control in accordance with the instruction.

In this embodiment, the "television broadcast wave receiving and decoding section" 21 has a feature of receiving analog terrestrial television broadcasting, digital terrestrial television broadcasting, broadcasting satellite (BS) broadcasting, communication satellite (CS) broadcasting, and so on.

The "television broadcast wave receiving and decoding section" 21 receives and decodes a television broadcast program of a television broadcast wave selected based on a television broadcast program selection control signal supplied from the control section 10, and sends, to the system bus 100, video and audio signals AV of a television broadcast program content obtained by the decoding.

The control section 10 generates the television broadcast program selection control signal to be supplied to the television broadcast wave receiving and decoding section 21, based on a broadcast wave selection operation input and a broadcast program selection operation input, which are made by the user by using the operation section 25.

When the control section 10 determines that neither a recording start instruction nor a reproducing start instruction has been issued by the user by operating the operation section 25, the control section 10 allows the video and audio signals AV, which have been sent from the television broadcast wave receiving and decoding section 21 to the system bus 100, to be sent to the monitor apparatus 2 via the monitor output interface 24, so that video is displayed on the display of the monitor apparatus 2 and audio is outputted by the loudspeaker.

Meanwhile, when the control section 10 determines that the recording start instruction has been issued by the user by operating the operation section 25, the control section 10 allows the video and audio signals AV, which have been sent from the television broadcast wave receiving and decoding section 21 to the system bus 100, to be sent to the recording and reproducing section 22.

The recording and reproducing section 22 includes a recording encoding section and a reproducing decoding section. When it is determined that the recording start instruction has been received, the recording encoding section of the recording and reproducing section 22, under control of the control section 10, subjects the video and audio signals AV to a recording encoding process, including data compression, and the resulting signals are written to the recording information storage section 23 to be stored therein.

In this embodiment, the recording information storage section 23 is formed by a hard disk drive or a large-capacity semiconductor memory device, and thus is capable of storing a relatively large number of television broadcast program contents.

In the first embodiment, the "television broadcast wave receiving and decoding section" 21 has a function of acquiring electronic programming guide (EPG) information from the television broadcast wave.

The control section 10 temporarily stores the EPG information in the RAM 13, for example, and when storing recording information of a television broadcast program content, recording of which has been requested, in the recording information storage section 23, the control section 10 extracts content-related information from the temporarily-stored EPG information, and stores the extracted content-related information in the recording information storage section 23 so as to be associated with the recorded television broadcast program content. The content-related information includes a title of the recorded television broadcast program content, a name of a person who appears in the content, information concerning a content of the content, and so on. Information such as a recording date and time is also stored in the recording information storage section 23 so as to be associated with the content.

In the first embodiment, the user is able to issue an instruction to display a list of recorded television broadcast program contents (hereinafter referred to as "recorded contents"), for example, using the operation section 25, before reproducing one of the recorded contents.

Upon receipt of the instruction to display the list of the recorded contents, the control section 10 according to this embodiment sends, to the monitor apparatus 2, information concerning the list of the recorded broadcast programs, so that the display of the monitor apparatus 2 displays the list. The list shows the title and recording date and time of each of the television broadcast program contents stored in the recording information storage section 23.

In this embodiment, this list of the recorded contents can be used not only to select a desired recorded content to start the reproducing of the content, but also to select a desired recorded content to issue an instruction to search for a reputation of the content.

Upon receipt of the instruction to search for the reputation of the selected recorded content after the displaying of the list of the recorded contents, the control section 10, as described below, uses the reputation search section 30 and the reputation search-use dictionaries 40 to acquire information of the reputation result of the selected recorded content from information acquired from the Internet 3, and sends the information of the reputation result to the monitor apparatus 2, so that the display of the monitor apparatus 2 displays the information of the reputation result. Referring to the information of the reputation result as displayed by the display of the monitor apparatus 2, the user is able to select one of the recorded contents from the large number of recorded contents to start the reproducing of the selected content.

When the control section 10 determines that the reproducing start instruction with respect to a recorded content selected from the list of the recorded contents has been issued by the user by operating the operation section 25, the control section 10 reads the recording information of the selected recorded content from the recording information storage section 23, and sends the recording information to the recording and reproducing section 22.

Under control of the control section 10, the recording and reproducing section 22 allows the reproducing decoding section to operate to subject the recording information of the selected recorded content to a reproducing decoding process, including decompression/decoding, to reconstruct the video and audio signals AV. Under control of the control section 10, the reconstructed video and audio signals AV are sent to the monitor apparatus 2, and reproduced video is displayed on the display, whereas reproduced audio is outputted by the loudspeaker.

Next, the reputation search section 30 will now be described below. In this embodiment, the reputation search section 30 includes a communication interface 31 for connection to the Internet 3, an internet search section 32, a Hyper-Text Markup Language (HTML) parsing section 33, an HTML crawling section 34, a morphological analysis engine 35, a syntactic analysis engine 36, and a reputation determination section 37. Each of the communication interface 31, the internet search section 32, the HTML parsing section 33, the HTML crawling section 34, the morphological analysis engine 35, the syntactic analysis engine 36, and the reputation determination section 37 is connected to the system bus 100.

Note here that the internet search section 32, the HTML parsing section 33, the HTML crawling section 34, the morphological analysis engine 35, the syntactic analysis engine 36, and the reputation determination section 37 may be implemented either in hardware or by a software application. In the case where these sections are implemented by the software application, the software application is stored in the ROM 12 beforehand.

In this embodiment, the reputation search-use dictionaries 40 include a morphological analysis dictionary 41, a syntactic analysis dictionary 42, a thesaurus dictionary 43, and a reputation rule dictionary 44. Each of these dictionaries 41 to 44 is connected to the system bus 100.

Each component of the reputation search section 30 is activated by the control section 10 when the user has issued the instruction to search for the reputation of the selected recorded content.

The internet search section 32 has stored therein a URL of the search site 4. As described below, the internet search section 32 generates a site search request including the search keyword extracted from the content-related information of the selected recorded content, of which the instruction to search for the reputation has been issued, and, under control of the control section 10, accesses the search site 4 via the communication interface 31.

The HTML parsing section 33 has a processing capability to analyze documents written in HTML (hereinafter referred to as "HTML documents"; not only written texts composed of text characters but also images can be placed on the HTML documents), and eliminate tags and an image portion to extract only a written text portion composed of the text characters. The term "to parse" as used herein means to analyze the HTML document to extract only the written text portion.

The HTML crawling section 34 performs a process of performing the following operation with respect to a plurality of levels: collecting HTML documents on a website, parsing the collected HTML documents to identify a website linked to the first website, collecting HTML documents on the identified website linked to the first website, parsing the collected HTML documents to identify a link included in the HTML documents, collecting HTML documents on a destination of the identified link, parsing the collected HTML documents, and so on. This process is referred to as "crawling".

The morphological analysis engine 35 performs a process of dividing a phrase or passage into morphemes, i.e., the smallest units of meaning in a language, and identifying a part of speech (e.g., a noun, a verb, an adverb, a postpositional word functioning as an auxiliary to a main word, an adjective, etc.) of each of the morphemes, referring to the morphological analysis dictionary 41. Dictionary data for the morphological analysis dictionary 41 may be either obtained via the Internet 3 or generated specially for the recording and reproducing apparatus 1 beforehand. Because morphological analysis and the morphological analysis dictionary are well known, detailed descriptions thereof are omitted here.

In a situation where words and the part of speech of each of the words in a passage have been identified as a result of the morphological analysis performed by the morphological analysis engine 35, the syntactic analysis engine 36 performs a process of identifying a rule according to which the passage is constructed while referring to the syntactic analysis dictionary 42. Dictionary data for the syntactic analysis dictionary 42 may also be either obtained via the Internet 3 or generated specially for the recording and reproducing apparatus 1 beforehand. Because syntactic analysis and the syntactic analysis dictionary are well known, detailed descriptions thereof are omitted here.

In this embodiment, the reputation determination section 37 performs a process of calculating a reputation value (a reputation score) as the reputation result, referring to the reputation rule dictionary 44. In this embodiment, dictionary data for the reputation rule dictionary 44 is generated specially for the recording and reproducing apparatus 1 beforehand.

[Creation of Reputation Rule Dictionary]

A procedure of a method of generating the dictionary data for the reputation rule dictionary 44 will now be described below with reference to a flowchart of FIG. 3. FIG. 4 shows an example of the dictionary data for the reputation rule dictionary 44.

First, reputation expressions and evaluation values (scores) thereof are registered in the reputation rule dictionary 44 (step T1). The term "reputation expression" as used herein refers to words or phrases that express positive or negative views, such as "amusing", "moving", "good", "dull", "not amusing", and "not good". Positive (+) evaluation values (scores) are assigned to positive reputation expressions, while negative (−) evaluation values (scores) are assigned to negative reputation expressions.

Regarding the positive reputation expressions, as shown in FIG. 4, an evaluation value of "+5 points" is assigned to "amusing" and "moving", and an evaluation value of "+2 points" is assigned to "good", for example. Regarding the negative reputation expressions, an evaluation value of "−5 points" is assigned to "dull" and "not amusing", and an evaluation value of "−2 points" is assigned to "not good", for example.

Next, extent expressions and weighting factors (coefficients) thereof are registered in the reputation rule dictionary 44 (step T2). The term "extent expression" as used herein refers to words or phrases that indicate the extent of a word or phrase they refer to, such as "very", "quite", "totally", and "highly". When the extent expression appears in front of the reputation expression, the weighting factor (coefficient) of the extent expression is used as a coefficient for the evaluation value of the reputation expression.

As shown in FIG. 4, a weighting factor (coefficient) of "×2" is assigned to the extent expression "very", and a weighting factor (coefficient) of "×3" is assigned to the extent expression "quite", for example.

Lastly, each of the registered reputation expressions and extent expressions is subjected to the morphological analysis by the morphological analysis engine 35, and the analysis result is stored in the reputation rule dictionary 44 so as to be associated with the corresponding reputation expression or extent expression as shown in FIG. 4 (step T3). Thus, the creation of the reputation rule dictionary 44 is complete. Note that the results of the morphological analysis for the reputation expression and the extent expression will be hereinafter referred to as a "reputation expression (morphological analysis result)" and an "extent expression (morphological analysis result)", respectively.

The thesaurus dictionary 43 is a dictionary in which expressions (hereinafter referred to as "semantically similar expressions") that are similar to entry expressions, such as synonyms, similar words, and abbreviations, are registered. Such semantically similar expressions are originally registered in the thesaurus dictionary 43, but the user is allowed to additionally register a synonym, a similar word, an abbreviation, and so on, as necessary.

When posting reviews of the content on bulletin boards or blogs, the users may use a synonym, an abbreviation, or the like of the search keyword. The thesaurus dictionary 43 is prepared in view of this fact. As described below, when the reputation of the content is searched for, the semantically similar expressions of the search keyword are also taken into account, with the use of the thesaurus dictionary 43.

[Reputation Search Process]

Next, a procedure of the search for the reputation of the television broadcast program content stored in the recording information storage section 23, the procedure being performed in the recording and reproducing apparatus 1 having the above-described structure, will now be described below with reference to FIGS. 5, 6, 7, 8, and 9.

Figure 5:
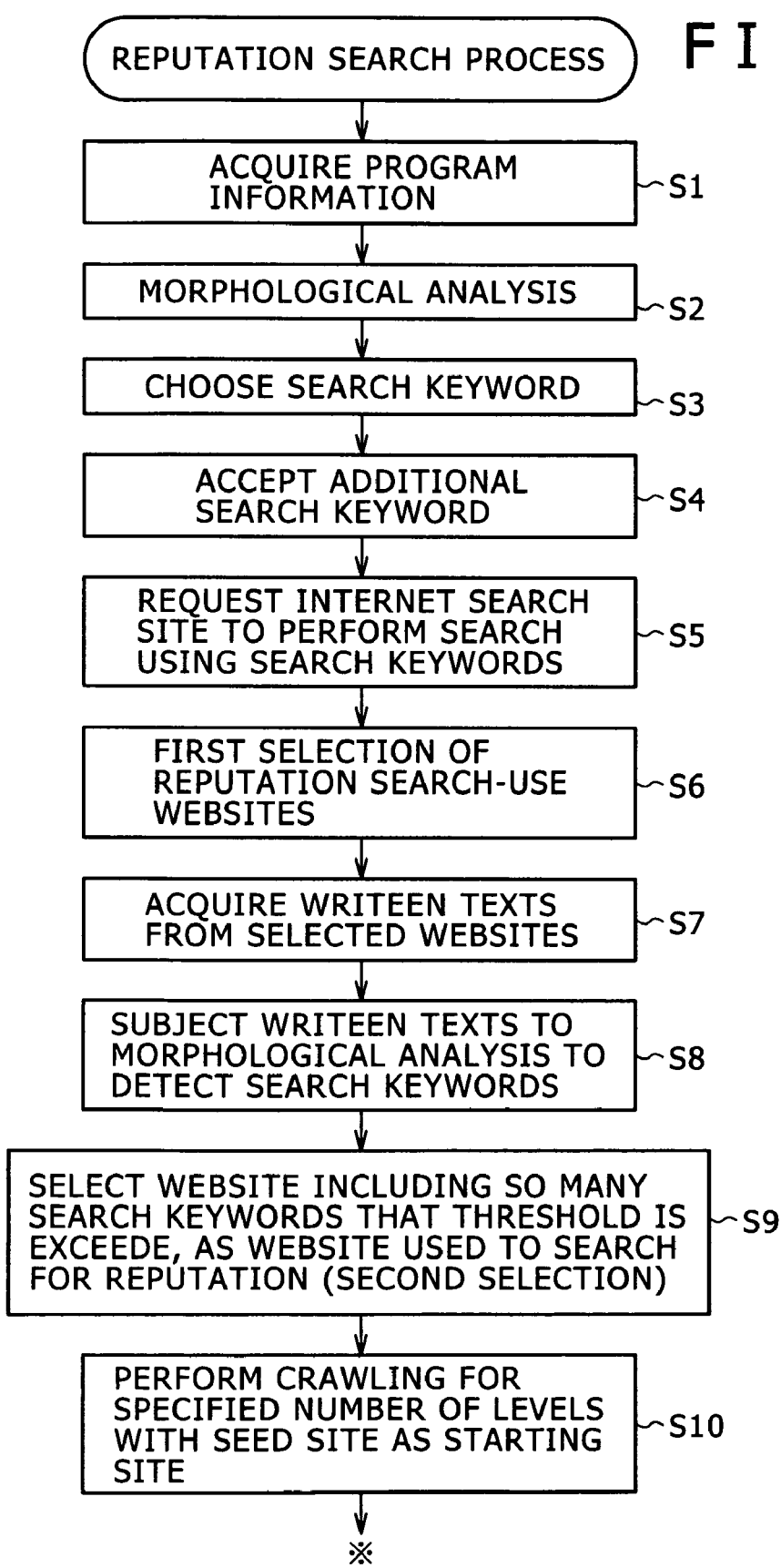
FIGS. 5, 6, 7, 8, and 9 are flowcharts each illustrating a part of a reputation search process performed by the information processing apparatus according to the first embodiment.
Figure 6:
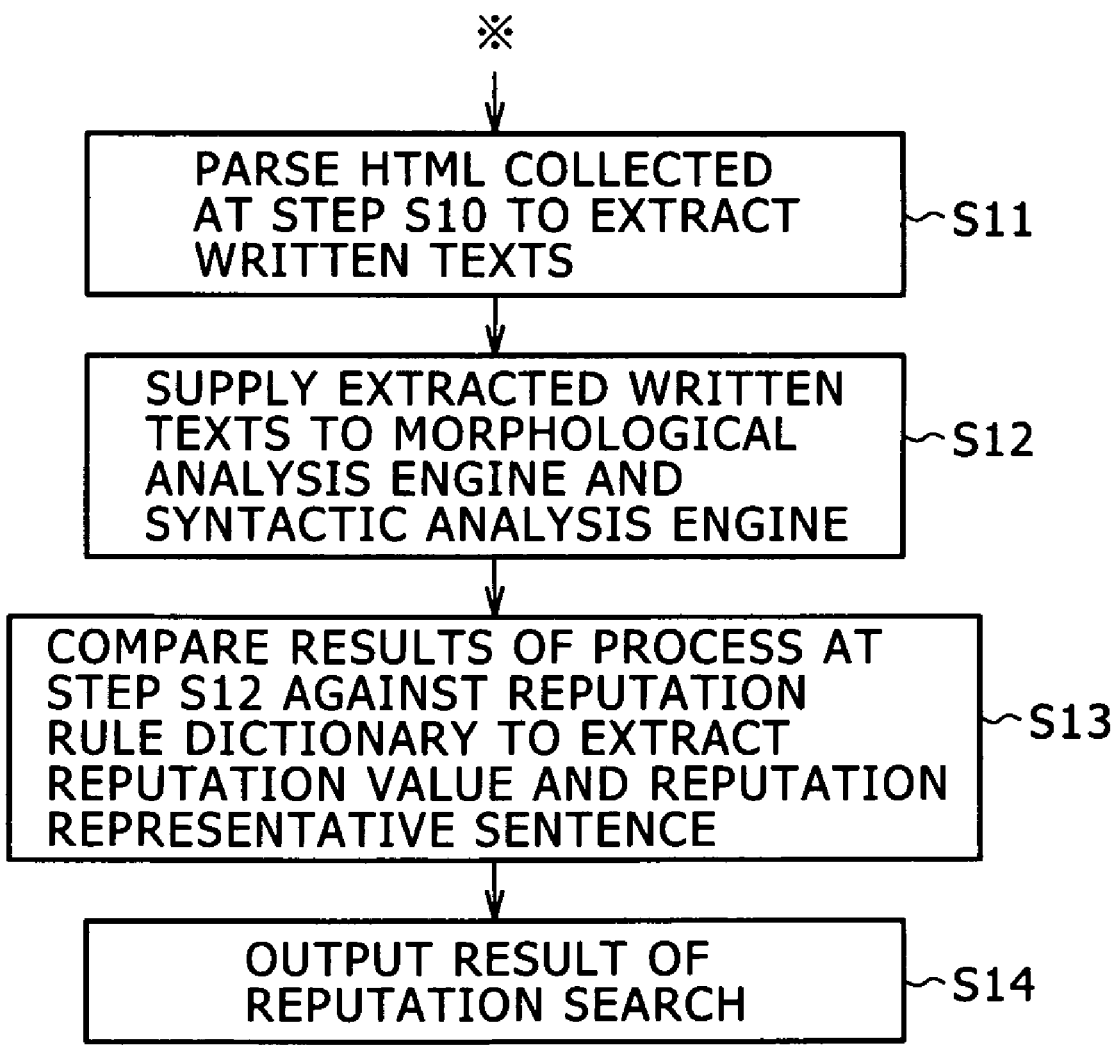

FIGS. 5 and 6 are flowcharts illustrating an exemplary flow of a reputation search process. In the recording and reproducing apparatus 1 according to this embodiment, the reputation search section 30 performs, under control of the control section 10, the reputation search process using the reputation search-use dictionaries 40. In this embodiment, the reputation search process illustrated by the flowcharts of FIGS. 5 and 6 is started when the user has selected, from the list of the recorded contents, a specific recorded content and performed an operation of initiating the search for the reputation of the selected content, as described above.

Figure 7:
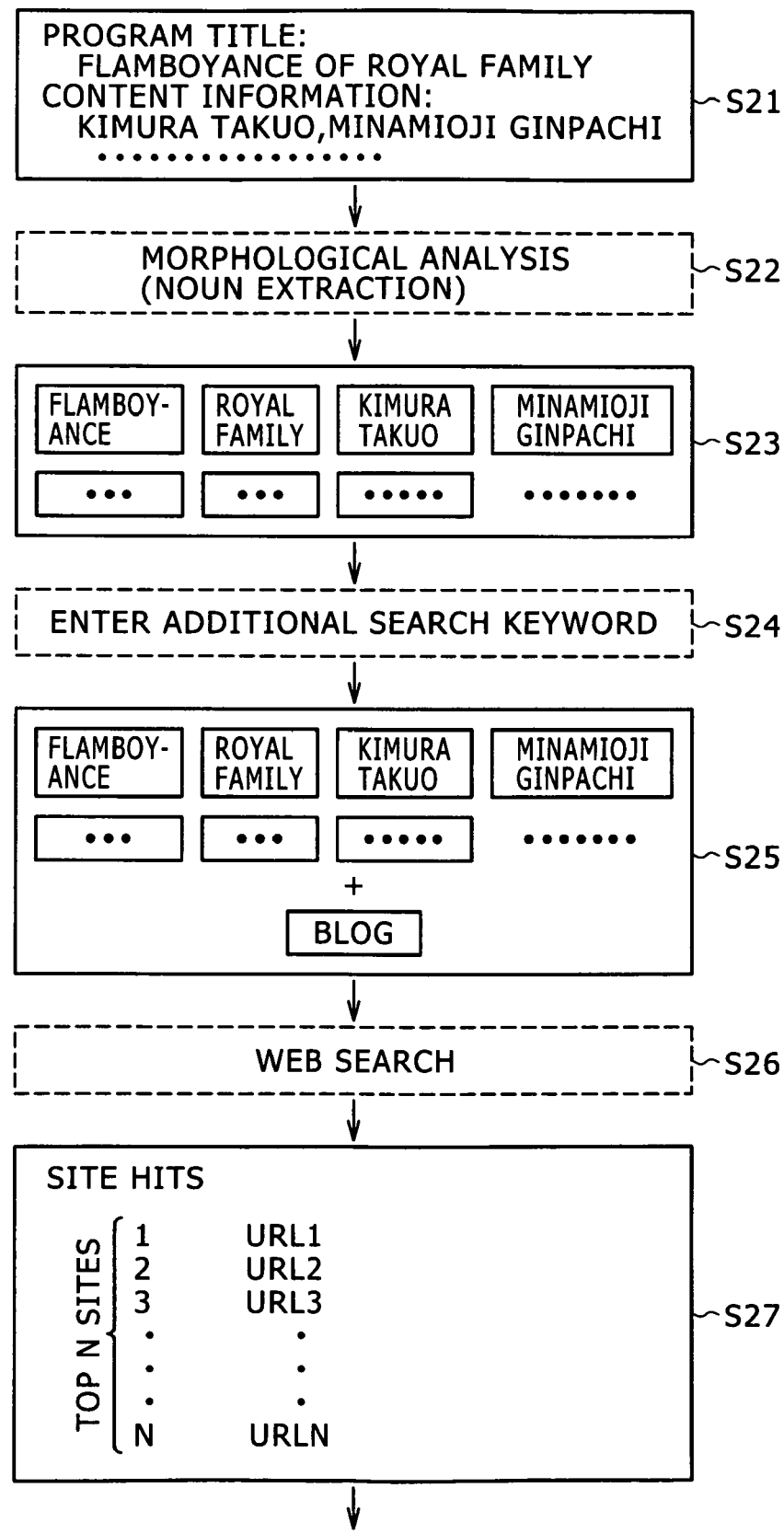
Figure 8:
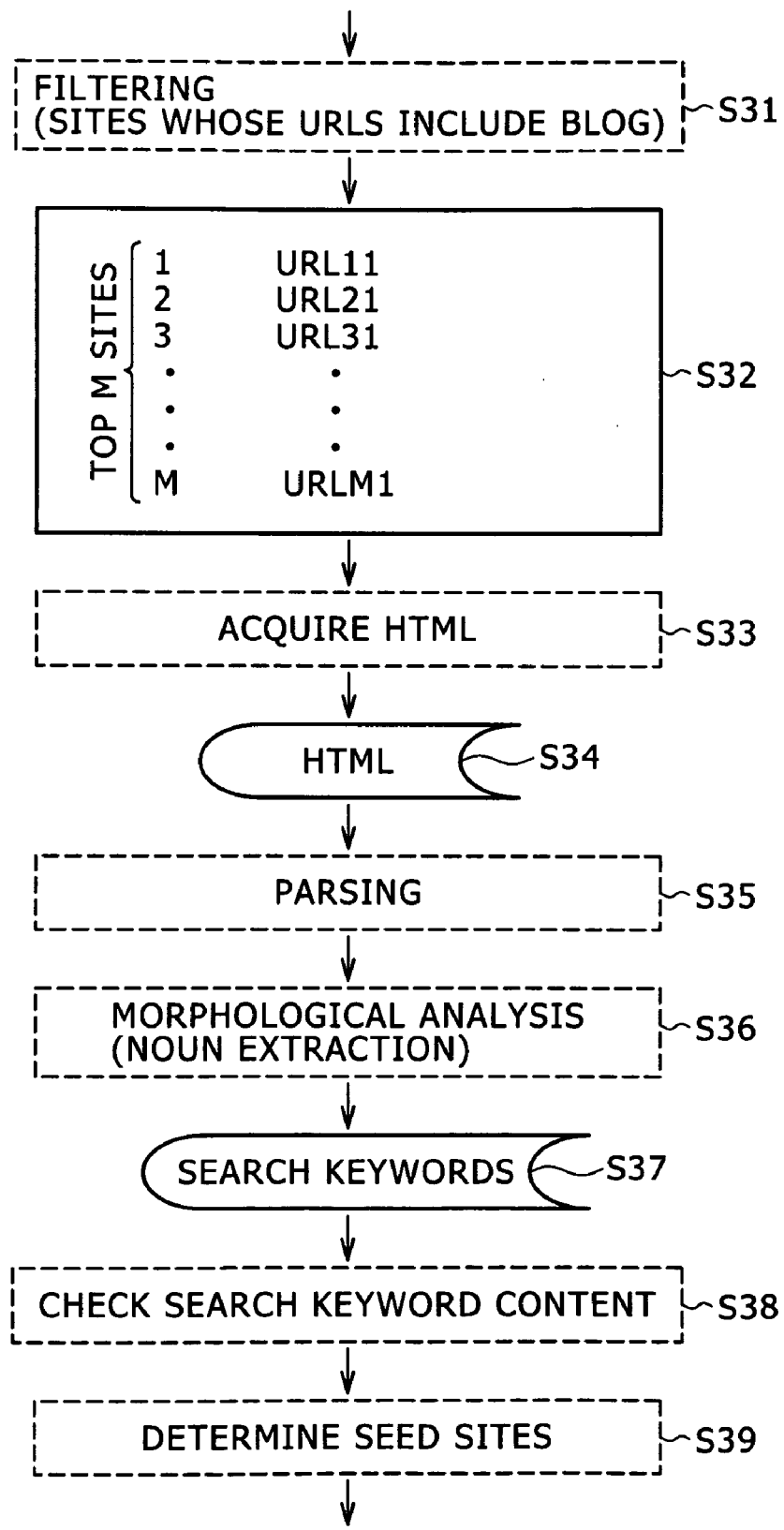
Figure 9:
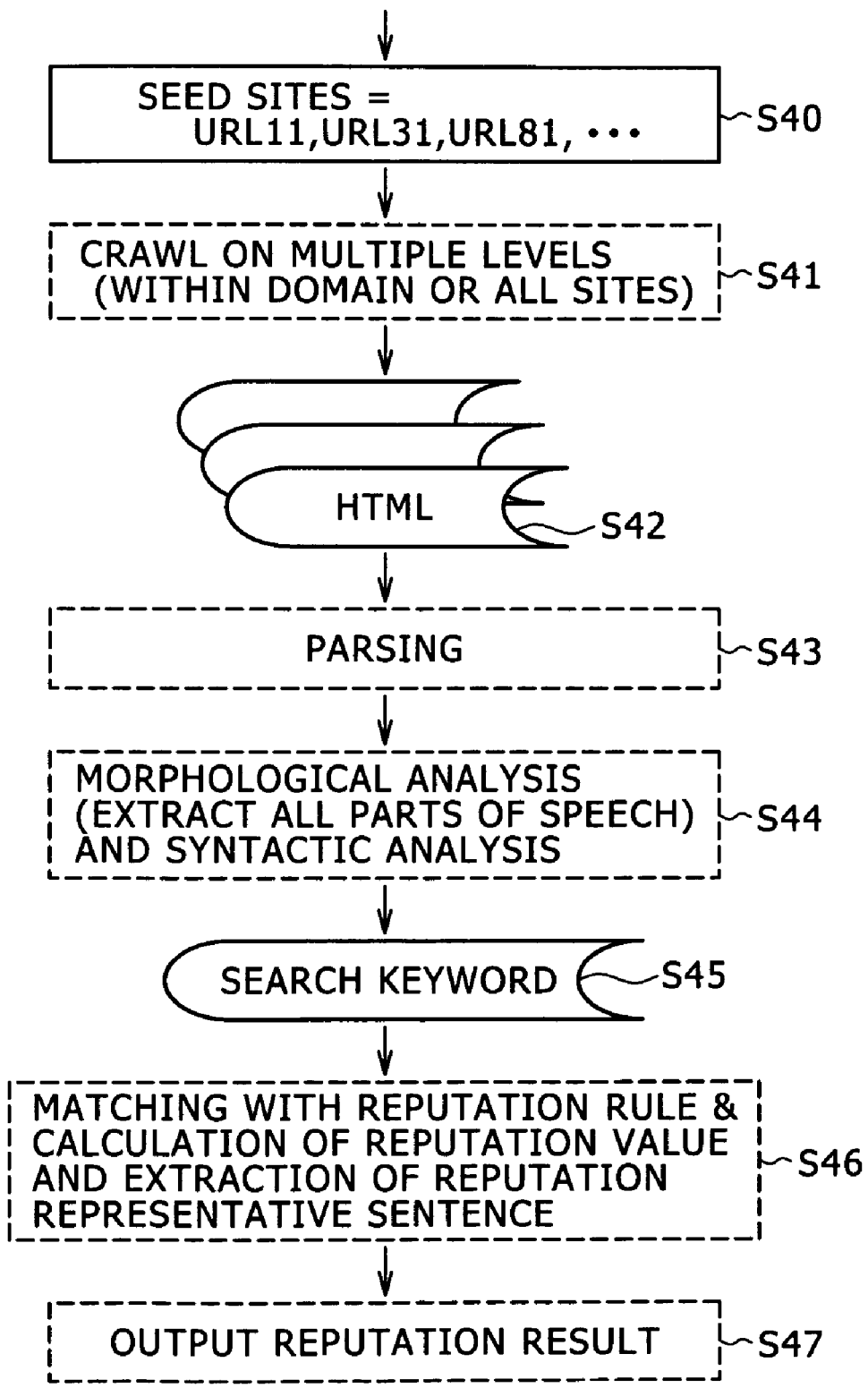

FIGS. 7 to 9 are flowcharts that supplementarily illustrate processes of respective steps as shown in FIGS. 5 and 6, with reference to specific examples. While the flow of FIGS. 5 and 6 does not correspond with the flow of FIGS. 7 to 9 completely, a correspondence between the two flows will be apparent.

Upon receipt of the instruction to search for the reputation of the selected recorded content, the control section 10 first reads the content-related information stored in the recording information storage section 23 so as to be associated with the selected recorded content, and acquires the title and program content information of this recorded content, which have been obtained from the EPG (step S1 in FIG. 5).

Then, the control section 10 supplies the acquired content-related information (program information) to the morphological analysis engine 35, and allows the morphological analysis engine 35 to subject the content-related information to the morphological analysis (step S2 in FIG. 5). Then, the control section 10 chooses, as the search keyword, an expression detected as a noun as a result of the morphological analysis, and supplies the search keyword to the internet search section 32 (step S3 in FIG. 5).

For example, suppose that the content-related information acquired at step S1 is information that includes the title of the recorded content "Flamboyance of Royal Family" and the program content information including words "Kimura Takuo", "Minamioji Ginpachi", and so on, which indicate people that appear in the recorded content (see step S21 in FIG. 7). In this case, as a result of noun extraction by the morphological analysis (see step S22 in FIG. 7), "Flamboyance", "Royal Family", "Kimura Takuo", "Minamioji Ginpachi", and so on are extracted as the search keywords (see step S23 in FIG. 7).

Note that, in this case, the result of the morphological analysis concerning the title will be hereinafter referred to as a "title (morphological analysis result)", whereas the result of the morphological analysis concerning the program content information will be hereinafter referred to as "content information (morphological analysis result)".

In this embodiment, the search keywords used for the reputation search are not limited to those automatically extracted from the content-related information as described above, but the user is allowed to enter an additional search keyword to be used for the reputation search. Thus, the control section 10 allows a message that prompts the user to enter the additional search keyword to be displayed on the display of the monitor apparatus 2, for example, and waits for the user to enter the search keyword using the operation section 25. If the search keyword is entered by the user, the control section 10 supplies the entered search keyword to the internet search section 32 as the additional search keyword (step S4 at FIG. 5).

Note that the user does not have to enter any additional search keyword. The user may enter an instruction to the effect that no additional search keyword is needed. In that case, the control section 10 dismisses the message that prompts the user to enter the additional search keyword, and proceeds to the next step. In this case, only the search keywords extracted at step S3 in FIG. 5 are used for the reputation search. Note that step S4 for acceptance of the additional search keyword may be omitted.

For example, suppose that the user has entered the additional search keyword (see step S24 in FIG. 7), and that this additional search keyword is "blog". In this case, the additional search keyword "blog" is added to the search keywords acquired at step S3 in FIG. 5 (=step S21 in FIG. 7) (see step S25 in FIG. 7).

Note that the additional search keyword "blog" is a keyword the user added with the intention to acquire reputation information from the blog sites.

It will be appreciated that the additional search keyword is not limited to this example. In the case where the user desires to acquire the reputation information from the bulletin board sites, for example, the user may enter "bulletin board" as an additional search keyword. It is to be appreciated that the user may enter, as the additional search keyword, not expressions concerning the websites but expressions related to the selected recorded content (the reputation of which is to be searched for).

Next, the control section 10 controls the internet search section 32 to send a search request to the search site. Accordingly, the internet search section 32 sends the search request, including the received search keywords, to the previously-registered search site 4 via the communication interface 31 and the Internet 3 (step S5 in FIG. 5).

In response to this search request, the search site 4 searches for websites with a web page including the received search keywords, and sends information of URLs of the websites found as a result of the search to the recording and reproducing apparatus 1. Thus, the control section 10 receives the information of the URLs via the communication interface 31, and temporarily stores information of the URLs of top N websites in the RAM 13 or free space in the recording information storage section 23, which is formed by the hard disk drive, for example.

The fact that the URLs of only the top N websites are stored means that a finite number of websites are selected from an enormous number of websites found as a result of the search (first selection of reputation search-use websites; step S6 in FIG. 5).

In the example of FIG. 7, the search site performs a search using the search keywords "Flamboyance", "Royal Family", "Kimura Takuo", "Minamioji Ginpachi", and so on, and in addition "blog" (see step S25 in FIG. 7) (Web search; see step S26 in FIG. 7). As a result of this search, an enormous number of websites are found, but the URLs of the top N websites among them are stored (see step S27 in FIG. 7).

Note that, in the first selection of the reputation search-use websites at step S6 in FIG. 5, the number of websites may be further reduced using a specific word, e.g., "blog", included in the URLs. URLs including such a specific word are very likely to be URLs of a specific type of websites, and therefore such a specific word can be used to select only the specific type of websites. For example, it is possible to extract only blog sites by using the specific word "blog", i.e., by selecting only websites whose URLs include the specific word "blog".

In this example, websites whose URLs include the word "blog" are selected from the top N websites (see step S31 in FIG. 8). If the number of websites that have been selected from the top N websites is greater than a predetermined finite number M (M≦N), top M websites are further selected from the selected websites in this example (see step S32 in FIG. 8).

Note that it may be so arranged that the websites whose URLs include the word "blog" are first selected from the websites found as a result of the search, and thereafter top N websites are selected from the selected websites.

After the first selection of the reputation search-use websites is complete as described above, the control section 10 accesses the selected websites sequentially to collect the HTML documents from each of the websites, supplies the collected HTML documents to the HTML parsing section 33, and controls the HTML parsing section 33 to extract a written text from each of the HTML documents (step S7 in FIG. 5, and steps S33, S34, and S35 in FIG. 8).

For example, suppose that one of the collected HTML documents describes "<HTML><BODY>Yesterday's Flamboyance of Royal Family was <B>quite<B> amusing!</BODY></HTML>". In this case, as a result of the parsing by the HTML parsing section 33, a written text "Yesterday's Flamboyance of Royal Family was quite amusing!" is extracted from this HTML document.

Next, the control section 10 supplies each of the extracted written texts to the morphological analysis engine 35, and controls the morphological analysis engine 35 to subject the extracted written text to the morphological analysis to extract only nouns therefrom for detecting the search keywords (step S8 in FIG. 5, and steps S36 and S37 in FIG. 8).

Then, the control section 10 identifies a website with an HTML document including so many of the search keywords that a "search keyword content" exceeds a predetermined threshold θth (%), and selects the identified website as a website that is used to search for the reputation (second site selection) (step S9 in FIG. 5, and steps S38 and S39 in FIG. 8). The website selected in this second site selection will be hereinafter referred to as a "seed site". This is because this website is a starting point of the crawling as described below.

In the second site selection, the search keyword content is calculated while a different weight is assigned to each of the search keywords depending on whether the search keyword has been extracted from the title of the broadcast program content, whether the search keyword has been extracted from the program content information, or whether the search keyword has been additionally entered by the user.

For example, a weight of 1.5 is assigned to the detected search keyword when that search keyword has been extracted from the title, a weight of 1.0 is assigned to the detected search keyword when that search keyword has been extracted from the program content information, and a weight of 0.8 is assigned to the detected search keyword when that search keyword has been additionally entered by the user.

For example, suppose that five search keywords, "Flamboyance" and "Royal Family" extracted from the title, "Kimura Takuo" and "Minamioji Ginpachi" extracted from the program content information, and "blog" additionally entered by the user, have been selected at step S3. Then, in the case of an obtained written text "A blog for everyone: Yesterday's episode of Flamboyance of Royal Family where Kimura Takuo appeared was amusing!", for example, four search keywords, "blog", "Flamboyance", "Royal Family", and "Kimura Takuo", are detected at step S8.

Here, if all of the above five search keywords are detected, a score would be 1.5+1.5+1.0+1.0+0.8=5.8 sentence. Meanwhile, in the case of the above written text, where the four search keywords have been detected, the score is 1.5+1.5+ 1.0+0.8=4.8. Therefore, the search keyword content of the above written text as calculated at step S9 is 4.8/5.8≈82.8(%).

In the case where the above-described threshold θth is 70(%), the search keyword content of the above written text exceeds the threshold θth. Therefore, a website with a web page including the above written text is selected as the seed site at step S9.

Next, the control section 10 instructs the HTML crawling section 34 to perform the crawling for a predetermined number of levels, with each of the seed sites (see step S40 in FIG. 9) selected in the above-described manner as a starting site (step S10 in FIG. 5, and step S41 in FIG. 9).

The HTML crawling section 34 first collects HTML documents on the seed site, and parses the collected HTML documents to identify a link, then collects HTML documents on a destination of the identified link, and parses the collected HTML documents to identify a link included in the HTML documents, then collects HTML documents on a destination of the identified link, and parses the collected HTML documents, and so on. The HTML crawling section 34 repeats the above operation for the predetermined number of levels.

Note that, in this case, the number of levels for which the crawling is to be performed may be specified by the user before starting the reputation search process. Also note that the user may be allowed to specify whether the crawling should be performed within the range of link sites on the same domain, or within the range of all link sites, before starting the reputation search process.

Next, the control section 10 supplies the HTML documents collected at step S10 in FIG. 5 (see step S42 in FIG. 9) to the HTML parsing section 33, and controls the HTML parsing section 33 to parse the HTML documents to extract written texts therefrom (step S11 in FIG. 6, and step S43 in FIG. 9).

Next, the control section 10 controls the morphological analysis engine 35 and the syntactic analysis engine 36 to subject the written texts as extracted at step S11 to the morphological analysis and the syntactic analysis, respectively (step S12 in FIG. 6, and step S44 in FIG. 9). The result of the morphological analysis at this time will be hereinafter referred to as a "crawl written text (morphological analysis result)", whereas the result of the syntactic analysis at this time will be hereinafter referred to as a "crawl written text (syntactic analysis result)".

Next, the control section 10 supplies the crawl written texts (morphological analysis result) and the crawl written texts (syntactic analysis result) to the reputation determination section 37, and controls the reputation determination section 37 to extract, from the results of the process at step S12, the reputation value and a reputation representative sentence for the selected content (the reputation of which is being searched for), using the reputation rule dictionary (step S13 in FIG. 6, and step S46 in FIG. 9).

The reputation determination section 37 first searches through the crawl written texts (morphological analysis result) for a sentence that includes any reputation expression (morphological analysis result). Then, the reputation determination section 37 performs the following processes (1), (2), and (3) with respect to such sentences found.

(1) Referring to the crawl written texts (syntactic analysis result), the reputation determination section 37 identifies a word that is syntactically related to the reputation expression (morphological analysis result), and if the identified word is a word that is included in the title (morphological analysis result) or the content information (morphological analysis result), the reputation determination section 37 determines that that sentence describes a reputation concerning the program (this type of sentence will be hereinafter referred to as a "sentence of type A").

(2) Referring to the crawl written texts (syntactic analysis result), the reputation determination section 37 identifies a word that is syntactically related to the reputation expression (morphological analysis result), and if the identified word is a word that is related to (a related word of) a word that is included in the title (morphological analysis result) or the content information (morphological analysis result), the reputation determination section 37 determines that that sentence describes a reputation concerning the program (this type of sentence will be hereinafter referred to as a "sentence of type B").

Here, the term "related word" refers to a semantically related word, such as a synonym (for example, "Nippon" for "Japan") or a superordinate (for example, "Asia" for "Japan"). The thesaurus dictionary 43 is referenced to determine whether certain words are related words. This process is performed in view of a probability that a word related to the search keyword may be used in a review of the program, for example.

(3) Even if the sentence that has been found, from among the crawl written texts (morphological analysis result), as a sentence that includes the reputation expression (morphological analysis result) does not meet conditions as mentioned in (1) and (2) above, the reputation determination section 37 determines that this sentence describes a reputation concerning the program (this type of sentence will be hereinafter referred to as a "sentence of type C").

In this embodiment, the reputation determination section 37 calculates a positive reputation value and a negative reputation value separately. In connection with the sentences of the above three types A, B, and C, the reputation determination section 37, referring to the reputation rule dictionary 44, adds the evaluation value (score) of the found reputation expression to the positive reputation value if the evaluation value is positive, and adds the evaluation value (score) of the found reputation expression to the negative reputation value if the evaluation value is negative.

Note that, in this embodiment, different weighting coefficients are assigned to the types A, B, and C beforehand, and that the reputation determination section 37 adds, to the positive reputation value or the negative reputation value, the evaluation value (score) of the found reputation expression as multiplied by the weighting coefficient corresponding to the type of the sentence. In this case, these weighting coefficients are held in the reputation determination section 37, and the weighting coefficients satisfy the following inequality: the weighting coefficient for the type A>the weighting coefficient for the type B>the weighting coefficient for the type C.

Note that in the case where the syntactic relationship between the reputation expression (morphological analysis result) and the word identified in (1) or (2) above is accompanied with a negative expression, the reputation expression is reversed in meaning, and accordingly the reputation determination section 37 adds the evaluation value (score) of the reputation expression to the negative reputation value if the evaluation value (score) is positive, and adds the evaluation value (score) of the reputation expression to the positive reputation value if the evaluation value (score) is negative.

Further, in this embodiment, in the case where, in the crawl written texts (morphological analysis result), any extent expression (morphological analysis result) exists before the reputation expression (morphological analysis result), the reputation determination section 37 recognizes the coefficient of this extent expression from the reputation rule dictionary 44, and adds the evaluation value (score) of the reputation expression as multiplied by that coefficient to the positive reputation value or the negative reputation value.

Still further, in this embodiment, the reputation determination section 37 stores, as "reputation representative sentence candidates", the above three types of sentences as detected.

Next, the control section 10 extracts, as the reputation result, the positive reputation value and the negative reputation value as calculated by the reputation determination section 37 and one or more sentences chosen from the reputation representative sentence candidates, converts them into display information to be displayed on the display of the monitor apparatus 2, and sends the display information to the monitor apparatus 2 via the monitor output interface 24 (step S14 in FIG. 6, and step S47 in FIG. 9).

FIG. 10 shows an example of the reputation result as displayed. This example of the reputation result shows the positive reputation value (Positive), the negative reputation value (Negative), several positive representative sentences, several negative representative sentences, the number of websites found as a result of the search, and the number of extracted sentences concerning the reputation.

There are various methods available for choosing the several reputation representative sentences from the stored reputation representative sentence candidates. For example, sentences including more search keywords extracted from the title than search keywords extracted from the program content information may be chosen preferentially. Also, sentences with greater frequencies of a word that appears frequently in all the reputation representative sentence candidates may be chosen preferentially. Also, the several reputation representative sentences may be chosen at random.

As described above, according to the above-described first embodiment, the finite number of websites are selected in two steps from the enormous number of websites found as a result of the search through the Internet using the search keywords, then the crawling is performed with respect to the finite number of websites to detect the sentences that describe the reputation, and the reputation result is obtained from these detected sentences. Thus, a reputation search apparatus can be constructed with a relatively simple structure.

Therefore, the recording and reproducing apparatus can be equipped with the reputation search section as one functional block as in the above-described embodiment. Thus, it is not necessary to boot a personal computer connected to the Internet to search for the reputation of each program using the above-described system for determining the reputation. As in the above-described embodiment, the recording and reproducing apparatus itself is capable of searching through the Internet for the reputation of each program, and displaying the reputation. This is very convenient for the user.

The information processing apparatus according to the above-described first embodiment is the recording and reproducing apparatus. It will be appreciated, however, that the information processing apparatus according to the present invention is not limited to the recording and reproducing apparatus. Also note that, in the above-described embodiment, the reputation of the broadcast program content is searched for, and accordingly the search keyword is extracted from the information obtained from the EPG information. It will be appreciated, however, that this is simply one example and is not essential to the present invention. For example, in the case where a content providing server has stored therein the content-related information, such as the titles of the contents and information describing the contents of the contents, the information processing apparatus may acquire the content-related information from the content providing server to extract the search keyword therefrom.

Second Embodiment of Information Processing Apparatus

In the above-described first embodiment, the recording and reproducing apparatus itself forms one embodiment of the information processing apparatus according to the present invention. However, a server apparatus used for reputation search may be provided on the Internet or a LAN. Such a server apparatus used for reputation search may also form one embodiment of the information processing apparatus according to the present invention, for example. A second embodiment as described below is one example of that case.

FIG. 11 is a diagram illustrating an outline of a system that includes an information processing apparatus according to the second embodiment.

In the second embodiment, a "program reputation search storage server apparatus" 7 is provided on the Internet. The program reputation search storage server apparatus 7 includes components similar to the reputation search section 30 and the reputation search-use dictionaries 40 of the recording and reproducing apparatus 1 as described above. The program reputation search storage server apparatus 7 stores the reputation results of contents beforehand with respect to which a reputation search request is supposed to be made, and in response to the reputation search request from a client apparatus, such as the recording and reproducing apparatus 1, the program reputation search storage server apparatus 7 sends the corresponding reputation result stored therein to the client apparatus.

Therefore, in the second embodiment, unlike in the first embodiment, the recording and reproducing apparatus 1 includes neither the reputation search section 30 nor the reputation search-use dictionaries 40, which have been described above with respect to the first embodiment, and instead includes a functional block as the client apparatus that makes the reputation search request, as described below.

Figure 12:
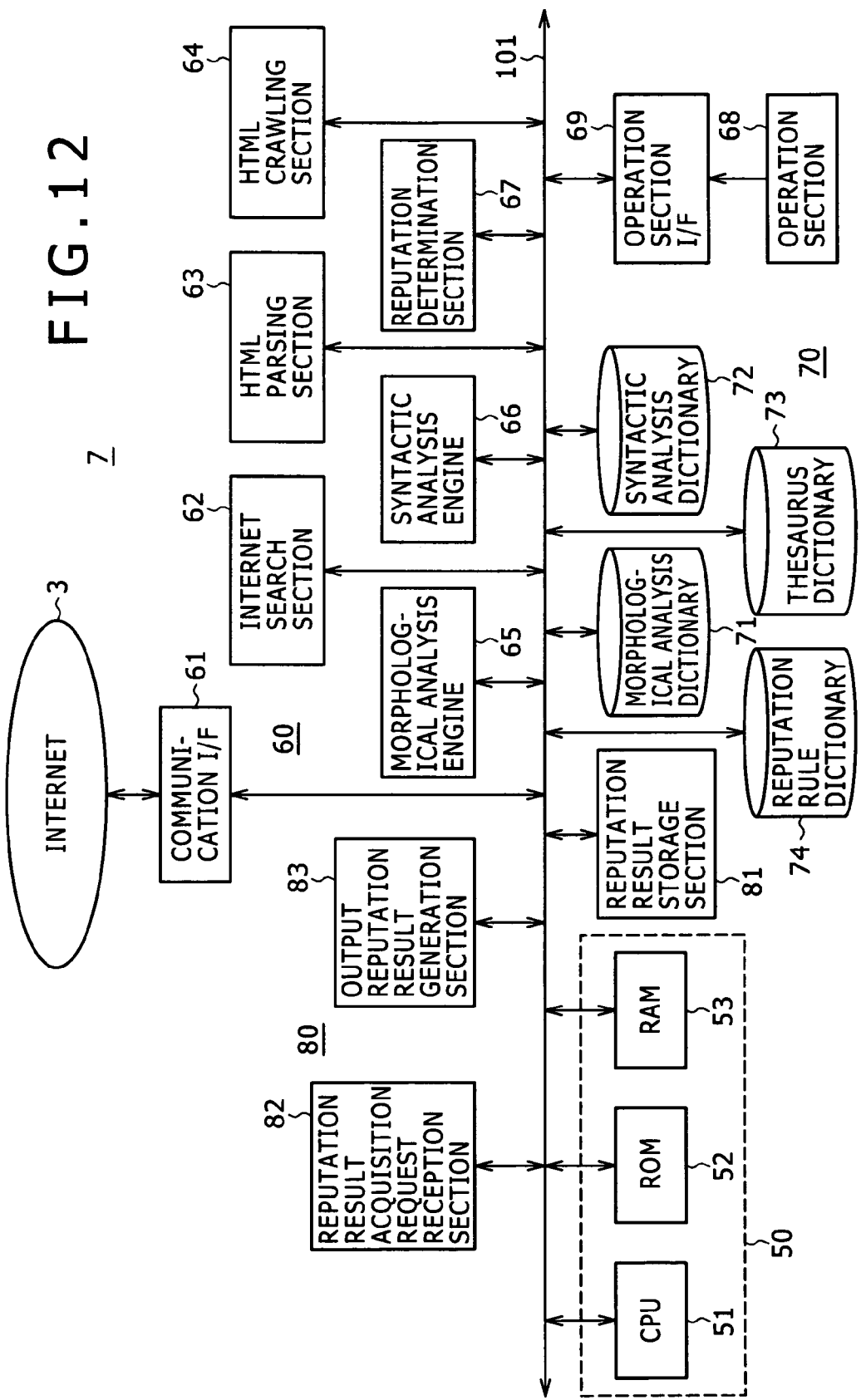
FIG. 12 is a block diagram illustrating an exemplary hardware structure of the information processing apparatus according to the second embodiment.

FIG. 12 is a block diagram illustrating an exemplary hardware structure of the program reputation search storage server apparatus 7 according to the second embodiment. As shown in FIG. 12, the program reputation search storage server apparatus 7 according to this embodiment includes a control section 50, a reputation search section 60, reputation search-use dictionaries 70, a reputation search request section 80, and a system bus 101. The control section 50, the reputation search section 60, the reputation search-use dictionaries 70, and the reputation search request section 80 are connected to the system bus 101.

As with the control section 10 as described above, the control section 50 is formed by a microcomputer, and includes a CPU 51, a ROM 52 for programs, and a RAM 53 for a work area. The ROM 52 stores the program for searching for the content reputation and acquiring the reputation result, a program for requesting the reputation search, and other programs. The CPU 51 executes the programs stored in the ROM 52 while using the RAM 53 as the work area, thereby controlling the various processes as described above.

The reputation search section 60 has the same structure as the reputation search section 30 in the above-described first embodiment. In this embodiment, the reputation search section 60 includes a communication interface 61 for connection to the Internet 3, an internet search section 62, an HTML parsing section 63, an HTML crawling section 64, a morphological analysis engine 65, a syntactic analysis engine 66, and a reputation determination section 67, each of which is connected to the system bus 101. In the second embodiment, an operation section 68 and an operation section interface 69, which are used to enter the additional search keyword, form part of the reputation search section 60.

Here, the internet search section 62, the HTML parsing section 63, the HTML crawling section 64, the morphological analysis engine 65, the syntactic analysis engine 66, and the reputation determination section 67 may be implemented either in hardware or by a software application. Note that in the case where they are implemented by the software application, the software application is stored in the ROM 52 beforehand.

The reputation search-use dictionaries 70 are the same as the reputation search-use dictionaries 40 in the above-described first embodiment. In this embodiment, the reputation search-use dictionaries 70 are composed of a morphological analysis dictionary 71, a syntactic analysis dictionary 72, a thesaurus dictionary 73, and a reputation rule dictionary 74, each of which is connected to the system bus 101.

The reputation search process which involves the use of the reputation search section 60 and the reputation search-use dictionaries 70 is identical to the reputation search process in the above-described first embodiment. However, the server apparatus 7 performs a reputation search as described in the above-described first embodiment beforehand with respect to all broadcast program contents included in the EPG information sequentially. The server apparatus 7 further stores the reputation results (which include the reputation evaluation values, the reputation representative sentences, and so on) obtained as a result of this process in a reputation result storage section 81 in the reputation search request section 80 so as to be associated with the corresponding broadcast program contents.

The reputation search request section 80 includes the reputation result storage section 81, a "reputation result acquisition request reception section" 82, and an "output reputation result generation section" 83. The "reputation result acquisition request reception section" 82 receives a reputation result acquisition request from the client apparatus via the Internet 3, and analyzes the reputation result acquisition request to determine which broadcast program content it refers to. In this embodiment, the reputation result acquisition request from the client apparatus includes "broadcast program content identification information" for identifying the broadcast program content whose reputation is to be searched for, in order to notify the server apparatus 7 which broadcast program content the reputation result acquisition request refers to.

Examples of the broadcast program content identification information include: identification information that is originally assigned uniquely to each of the broadcast program contents; the title of each of the broadcast program contents; and a Gemstar code (G-code) that is assigned to each of the broadcast program contents.

In the reputation result storage section 81, the reputation result of each of the broadcast program contents is stored so as to be associated with the corresponding broadcast program content identification information.

Upon receipt of the reputation result acquisition request via the communication interface 61, the reputation result acquisition request reception section 82 extracts the identification information of the broadcast program content (the reputation of which is to be searched for) from the reputation result acquisition request, and transfers the extracted identification information of the broadcast program content to the output reputation result generation section 83. The output reputation result generation section 83 receives the identification information of the broadcast program content, and acquires, from the reputation result storage section 81, a reputation result stored in the reputation result storage section 81 so as to be associated with the received identification information of the broadcast program content. Then, the output reputation result generation section 83 generates "reputation result sending information" to be sent to the client apparatus that has made the reputation result acquisition request. Then, the output reputation result generation section 83 sends the generated reputation result sending information to the client apparatus via the communication interface 61 and the Internet 3.

In the case where the reputation result storage section 81 does not store the reputation result corresponding to the identification information of the broadcast program content (the reputation of which is to be searched for) as included in the reputation result acquisition request, the server apparatus 7 performs the reputation search process with respect to this broadcast program content, and sends a reputation result obtained as a result of the reputation search process to the client apparatus. The reputation result obtained at this time is also stored in the reputation result storage section 81.

FIG. 13 shows an exemplary hardware structure of the recording and reproducing apparatus 1, which is an example of the client apparatus according to the second embodiment.

As described above, the recording and reproducing apparatus 1 according to the second embodiment includes neither the reputation search section 30 nor the reputation search-use dictionaries 40, which have been described above with respect to the first embodiment, and instead includes a reputation result acquisition request section 90, which is the functional block as the client apparatus that makes the reputation search request.

In this embodiment, the reputation result acquisition request section 90 includes a reputation result acquisition request generation section 91, a reputation result reception section 92, and a reputation result display information generation section 93. When the control section 10 accepts the instruction to search for the reputation of the recorded content selected from the displayed list of the recorded contents, for example, the control section 10 activates the reputation result acquisition request section 90.

When the reputation result acquisition request section 90 is activated, first, the reputation result acquisition request generation section 91 sends the reputation search request with respect to the recorded content selected from the displayed list of the recorded contents to the program reputation search storage server apparatus 7 via the communication interface 31 and the Internet 3, after allowing the identification information (e.g., the title information) of the selected recorded content to be included in the reputation search request. Note that a URL of the program reputation search storage server apparatus 7 on the Internet 3 has previously been registered and stored in the recording and reproducing apparatus 1.

As described above, in response to the reputation search request with respect to this recorded content, the server apparatus 7 sends the reputation result of this recorded content to the recording and reproducing apparatus 1. Accordingly, the reputation result reception section 92 receives the reputation result via the communication interface 31, and transfers the received reputation result to the reputation result display information generation section 93.

The reputation result display information generation section 93 receives the reputation result and generates therefrom the display information concerning the reputation result as described above, and supplies the generated display information to the monitor apparatus 2 via the monitor output interface 24.

Thus, the reputation result of the recorded content as illustrated in FIG. 10 is displayed on the display of the monitor apparatus 2, whereby the reputation result is presented to the user.

In the second embodiment, the server apparatus 7 searches for the reputation result of the broadcast program content and stores the reputation result in the reputation result storage section 81 beforehand. Therefore, upon receipt of the reputation result acquisition request from the client apparatus, the server apparatus 7 is capable of immediately sending the reputation result stored in the reputation result storage section 81 to the client apparatus as a response to the acquisition request. Therefore, the user is able to see the reputation result of the recorded content quickly.

Note that the server apparatus 7 according to the second embodiment does not need to be connected to the client apparatus via the Internet. Alternatively, while the server apparatus 7 is connected to the Internet, the server apparatus 7 may be connected to the client apparatus via the LAN.

Other Embodiments or Variations

In the above-described embodiments, the reputations of the recorded contents are searched for. However, a reputation of a broadcast program content that is currently being broadcast may also be searched for, for example. This is accomplished when a television broadcast program reception apparatus is configured to allow a user to specify a broadcast program from a program schedule based on the EPG, in order to search for the reputation thereof, for example.

In the case where such a television broadcast program reception apparatus is applied to the first embodiment, the television broadcast program reception apparatus is configured to extract, from EPG data, a title and related information of the broadcast program, the reputation of which is to be searched for, then extract the search keyword therefrom, and perform the above-described reputation search process using the extracted search keyword.

Note that the present invention can be applied not only when selecting and receiving a real-time broadcast program but also when receiving and reproducing a content provided via Video on Demand. The present invention can also be applied in the case where broadcast programs are first stored in a server and a user selects, from the broadcast programs stored in the server, a desired broadcast program to receive it, as is the case with server-type broadcast programs.

In the foregoing descriptions, it has been assumed that the object of the reputation search is the broadcast program contents, but the object of the reputation search is not limited to the broadcast program contents. The present invention can also be applied to search for reputations of various other types of contents, such as music contents, electronic book contents, and video game contents.

As is apparent from the description of the second embodiment, the information processing apparatus according to the present invention does not have to reproduce or decode the content the reputation of which is searched for, but it simply needs to have a capability to search for the reputation of the content and present the reputation result to the user.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for searching reputation, comprising:
    an acquisition section configured to acquire content-related information including a title of a content and information describing a content of the content;
    a keyword extraction section configured to extract a search keyword from the content-related information acquired by said acquisition section;
    a site search section configured to perform a search through the Internet for websites with a web page including the search keyword extracted by said keyword extraction section, and acquire information concerning a plurality of websites found as a result of the search;
    a first site selection section configured to select top N websites from the plurality of websites found as a result of the search performed by said site search section, N being a predetermined integer greater than one;
    a second site selection section configured to access each of the N websites selected by said first site selection section to extract a written text from a web page of each of the N websites, and select two or more of the N websites as seed sites, the written text extracted from each of the seed sites containing so many instances of the search keyword as to exceed a predetermined threshold, in which in the selection of the seed sites by said second site selection section, the extracted written texts are subjected to morphological analysis, and the seed sites are selected based on a search keyword content of each of the written texts, and
    in calculation of the search keyword content, different weight are assigned to the search keyword depending on, at least, whether the search keyword has been extracted from the title of the content or from the information describing the content of the content; and
    a reputation result acquisition section configured to collect written texts from the two or more seed sites selected by said second site selection section and subordinate websites linked to the seed sites, and acquire a reputation result of the content from the collected written texts by searching through the written texts for sentences that include any reputation expression and calculate reputation values, the reputation result includes the reputations having the positive reputation values.

2. The information processing apparatus according to claim 1, further comprising:
    a storage section configured to store the reputation results of a plurality of contents as acquired by said reputation result acquisition section such that each of the reputation results is associated with information for identifying a corresponding one of the contents; and
    a reputation result sending section configured to, when an acquisition request for acquiring the reputation result has been received via a network, the acquisition request including the information for identifying the content, read the reputation result of the content identified by the information for identifying the content as included in the acquisition request from among the reputation results of the plurality of contents as stored in said storage section, and send the read reputation result to a sender of the acquisition request via the network.

3. An information processing apparatus for searching reputation, comprising:
    an acquisition section configured to acquire content-related information including a title of a content and information describing a content of the content;
    a keyword extraction section configured to extract a search keyword from the content-related information acquired by said acquisition section;
    a site search requesting section configured to request a search site on the Internet to perform a search for websites with a web page including the search keyword extracted by said keyword extraction section, and acquire information concerning a plurality of websites found as a result of the search;
    a first site selection section configured to select top N websites from the plurality of websites found as a result of the search performed by the search site, N being a predetermined integer greater than one;
    a second site selection section configured to access each of the N websites selected by said first site selection section to extract a written text from a web page of each of the N websites, and select two or more of the N websites as seed sites, the written text extracted from each of the seed sites containing so many instances of the search keyword as to exceed a predetermined threshold, in which the selection of the seed sites by said second site selection section, the extracted written texts are subjected to morphological analysis, and the seed sites are selected based on a search keyword content of each of the written texts, and in calculation of the search keyword content, different weight are assigned to the search keyword depending on, at least, whether the search keyword has been extracted from the title of the content or from the information describing the content of the content; and a reputation result acquisition section configured to collect written texts from the two or more seed sites selected by said second site selection section and subordinate websites linked to the seed sites, and acquire a reputation result of the content from the collected written texts by searching through the written texts for sentences that include any reputation expression and calculate reputation values, the reputation result includes the reputations having the positive reputation values.

4. The information processing apparatus according to claim 1, further comprising:

a keyword acceptance section configured to accept input of an additional search keyword, wherein said site search section requests the search site on the Internet to perform a search for websites that include the search keyword accepted by said keyword acceptance section in addition to the search keyword extracted by said keyword extraction section, and acquire information concerning a plurality of websites found as a result of this search.

5. The information processing apparatus according to claim 1, wherein said first site selection section includes a section configured to perform a search through the information concerning the plurality of websites found as a result of the search as acquired from the search site using a narrowing-down condition to select, from the plurality of websites found as a result of the search, a smaller number of websites.

6. The information processing apparatus according to claim 5, wherein the information concerning the plurality of websites as received by said site search section is uniform resource locators, URLs, and the narrowing-down condition used by said first site selection section is a specific word included in the URLs.

7. The information processing apparatus according to claim 1, wherein said reputation result acquisition section follows from each of the seed sites to the subordinate websites on progressively lower levels until a level that is a previously specified number of levels lower than a level of the seed site, and extracts and collects a written text from a web page of each of the seed sites and the subordinate websites.

8. The information processing apparatus according to claim 1, further comprising:

a reputation rule dictionary containing reputation expressions and evaluation values, each of the evaluation values being associated with a corresponding one of the reputation expressions, wherein said reputation result acquisition section detects a plurality of reputation expressions from the collected written texts, acquires corresponding evaluation values of the detected reputation expressions by referring to said reputation rule dictionary, and calculates a sum total of the acquired evaluation values of the detected reputation expressions as an evaluation result of the content.

9. The information processing apparatus according to claim 8, wherein each of the evaluation values of the reputation expressions in said reputation rule dictionary has a positive or negative value depending on whether the corresponding reputation expression represents a positive or negative view.

10. The information processing apparatus according to claim 8, wherein said reputation rule dictionary additionally contains extent expressions used to modify the reputation expressions, and weighting factors for the evaluation values of the reputation expressions, each of the extent expressions being associated with a corresponding one of the weighting factors, and in said reputation result acquisition section, if the reputation expression is modified by the extent expression, the evaluation value of the reputation expression multiplied by the weighting factor of the extent expression is used as an evaluation value when calculating the evaluation result of the content.

11. The information processing apparatus according to claim 8, wherein in said reputation result acquisition section, the collected written texts are subjected to morphological analysis to find the reputation expression, and the collected written texts are subjected to syntactic analysis to detect a word that is syntactically related to the found reputation expression, and if the detected word is the search keyword, the evaluation value of the found reputation expression is added as the evaluation result of the content.

12. The information processing apparatus according to claim 11, further comprising:

a thesaurus dictionary used to detect a word related to the search keyword, wherein the collected written texts are subjected to the morphological analysis to find the reputation expression, and the collected written texts are subjected to the syntactic analysis to detect the word that is syntactically related to the found reputation expression, and if the detected word is the word related to the search keyword as detected by said thesaurus dictionary, the evaluation value of the found reputation expression is added as the evaluation result of the content.

13. The information processing apparatus according to claim 12, wherein the evaluation value of the found reputation expression is multiplied by a different weighting factor depending on whether the detected word is the search keyword or whether the detected word is the word related to the search keyword as detected by said thesaurus dictionary, and the evaluation value of the found reputation expression multiplied by the weighting factor is added as the evaluation result of the content.

14. The information processing apparatus according to claim 11, further comprising:

a section configured to determine written texts in which the word syntactically related to the found reputation expression is the search keyword to be written texts that describe a reputation of the content, store these written texts as reputation representative sentence candidates, and present a sentence selected from the stored reputation representative sentence candidates to a user as a reputation representative sentence.

15. The information processing apparatus according to claim 14, further comprising:

a section configured to determine written texts in which the word syntactically related to the found reputation expression is the word related to the search keyword to be written texts that describe a reputation of the content, store these written texts as reputation representative sentence candidates, and present a sentence selected from the stored reputation representative sentence candidates to a user as a reputation representative sentence.

16. A method for searching for a reputation of a content employed by an information processing apparatus, the method comprising the steps of:

acquiring content-related information including a title of the content and information describing a content of the content;

extracting a search keyword from the content-related information acquired in said acquiring step;

searching through the Internet for websites with a web page including the search keyword extracted in said extracting step, and acquiring information concerning a plurality of websites found as a result of the search;

selecting top N websites from the plurality of websites found as a result of the search in said searching step, N being a predetermined integer greater than one; and accessing each of the N websites selected in said selecting step to extract a written text from a web page of each of the N websites, and selecting two or more of the N websites as seed sites, the written text extracted from each of the seed sites containing so many instances of the search keyword as to exceed a predetermined threshold, in which in the selection of the seed sites by said second site selection section, the extracted written texts are subjected to morphological analysis, and the seed sites are selected based on a search keyword content of each of the written texts, and in calculation of the search keyword content, different weight are assigned to the search keyword depending on, at least, whether the search keyword has been extracted from the title of the content or from the information describing the content of the content; and searching through the written texts for sentences that include any reputation expression and calculate reputation values, the reputation result includes the reputations having the positive reputation values.

17. The method according to claim 16, further comprising the step of:

collecting written texts from the two or more seed sites selected in said selecting step and subordinate websites linked to the seed sites, and acquiring a reputation result of the content from the collected written texts.

18. The method according to claim 17, further comprising the steps of:

storing the reputation results of a plurality of contents as acquired in said acquiring step in a storage section such that each of the reputation results is associated with information for identifying a corresponding one of the contents; and when an acquisition request for acquiring the reputation result has been received via a network, the acquisition request including the information for identifying the content, reading the reputation result of the content identified by the information for identifying the content as included in the acquisition request from among the reputation results of the plurality of contents as stored in said storing step, and sending the read reputation result to a sender of the acquisition request via the network.

19. A system for searching for a reputation of a content, the system comprising:

a server apparatus;

a network; and a client apparatus connected to said server apparatus via said network, wherein said server apparatus includes an acquisition section configured to acquire content-related information including a title of the content and information describing a content of the content, a keyword extraction section configured to extract a search keyword from the content-related information acquired by the acquisition section, a site search section configured to perform a search through the Internet for websites with a web page including the search keyword extracted by the keyword extraction section, and acquire information concerning a plurality of websites found as a result of the search, a first site selection section configured to select top N websites from the plurality of websites found as a result of the search performed by the site search section, N being a predetermined integer greater than one, a second site selection section configured to access each of the N websites selected by the first site selection section to extract a written text from a web page of each of the N websites, and select two or more of the N websites as seed sites, the written text extracted from each of the seed sites containing so many instances of the search keyword as to exceed a predetermined threshold, in which in the selection of the seed sites by said second site selection section, the extracted written texts are subjected to morphological analysis, and the seed sites are selected based on a search keyword content of each of the written texts, and in calculation of the search keyword content, different weight are assigned to the search keyword depending on, at least, whether the search keyword has been extracted from the title of the content or from the information describing the content of the content;

a reputation result acquisition section configured to collect written texts from the two or more seed sites selected by the second site selection section and subordinate websites linked to the seed sites, and acquire a reputation result of the content from the collected written texts by searching through the written texts for sentences that include any reputation expression and calculate reputation values, the reputation result includes the reputations having the positive reputation values, a storage section configured to store the reputation results of a plurality of contents as acquired by the reputation result acquisition section such that each of the reputation results is associated with information for identifying a corresponding one of the contents, and a reputation result sending section configured to, when an acquisition request for acquiring the reputation result has been received from said client apparatus via said network, the acquisition request including the information for identifying the content, read the reputation result of the content identified by the information for identifying the content as included in the acquisition request from among the reputation results of the plurality of contents as stored in the storage section, and send the read reputation result to a sender of the acquisition request via said network, and said client apparatus includes a section configured to send the acquisition request for acquiring the reputation result to said server apparatus via said network, the acquisition request including the information for identifying the content, and a section configured to receive the reputation result of the content from said server apparatus, and notify a user of the reputation result.

* * * * *